(12) United States Patent
Park et al.

(10) Patent No.: US 12,537,063 B2
(45) Date of Patent: Jan. 27, 2026

(54) MEMORY DEVICE

(71) Applicant: Samsung Electronics Co., Ltd., Suwon-si (KR)

(72) Inventors: Eunhyang Park, Suwon-si (KR); Jinyoung Kim, Suwon-si (KR); Sehwan Park, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 127 days.

(21) Appl. No.: 18/509,250

(22) Filed: Nov. 14, 2023

(65) Prior Publication Data

US 2024/0282387 A1 Aug. 22, 2024

(30) Foreign Application Priority Data

Feb. 17, 2023 (KR) .......................... 10-2023-0021391

(51) Int. Cl.
*G11C 16/24* (2006.01)
*G11C 16/04* (2006.01)
*G11C 16/08* (2006.01)
*G11C 16/26* (2006.01)

(52) U.S. Cl.
CPC .......... *G11C 16/24* (2013.01); *G11C 16/0483* (2013.01); *G11C 16/08* (2013.01); *G11C 16/26* (2013.01)

(58) Field of Classification Search
None
See application file for complete search history.

(56) References Cited

U.S. PATENT DOCUMENTS

| | | | |
|---|---|---|---|
| 10,090,046 B2 * | 10/2018 | Park | G11C 11/5642 |
| 10,395,727 B2 | 8/2019 | Yu et al. | |
| 10,559,362 B2 | 2/2020 | Shin et al. | |
| 10,607,708 B2 | 3/2020 | Oh et al. | |
| 10,629,259 B2 | 4/2020 | Jang | |
| 10,937,508 B2 | 3/2021 | Kim et al. | |
| 11,386,974 B2 | 7/2022 | Park et al. | |
| 2019/0072635 A1 | 3/2019 | Kang et al. | |
| 2020/0098436 A1 | 3/2020 | Kim et al. | |
| 2020/0286545 A1 | 9/2020 | Yoon | |

(Continued)

FOREIGN PATENT DOCUMENTS

| | | |
|---|---|---|
| KR | 10-2019-0025359 A | 3/2019 |
| KR | 10-2020-0107024 A | 9/2020 |

*Primary Examiner* — Kretelia Graham
(74) *Attorney, Agent, or Firm* — Harness, Dickey & Pierce, P.L.C.

(57) ABSTRACT

A memory device includes a cell region in which a plurality of memory cells are arranged and a peripheral circuit region in which a row decoder is connected to the plurality of memory cells through a plurality of wordlines, a plurality of page buffers connected to the plurality of memory cells through a plurality of bitlines, and a control logic controlling the row decoder and the plurality of page buffers are arranged. The row decoder inputs a plurality of read voltages having different levels to a selected wordline among the plurality of wordlines in sequence. Each of the plurality of page buffers includes a sensing node connected to one of the plurality of bitlines. Voltages of the sensing nodes included in the page buffers of a portion of the plurality of page buffers decrease differently while each of the plurality of read voltages is input to the selected wordline.

20 Claims, 26 Drawing Sheets

(56) References Cited

U.S. PATENT DOCUMENTS

| | | | |
|---|---|---|---|
| 2021/0012834 A1* | 1/2021 | Hsu | G11C 16/08 |
| 2022/0093184 A1 | 3/2022 | Kim et al. | |
| 2022/0139475 A1 | 5/2022 | Seo et al. | |
| 2022/0246208 A1 | 8/2022 | Xu et al. | |
| 2024/0028218 A1* | 1/2024 | Jeong | G11C 16/26 |

* cited by examiner

MEMORY DEVICE

CROSS-REFERENCE TO RELATED APPLICATION(S)

This application claims benefit of priority to Korean Patent Application No. 10-2023-0021391 filed on Feb. 17, 2023 in the Korean Intellectual Property Office, the disclosure of which is incorporated herein by reference in its entirety.

BACKGROUND

Various example embodiments relate to a memory device.

A memory device may provide a function of recording and erasing data and/or of reading written data. A memory device may execute one or more of a program operation, an erase operation, and a read operation in response to control signals transmitted by a memory controller, and data obtained by the memory device in the read operation may be output to the memory controller. When the memory device fails to correct an error in read data output as a result of the read operation, the memory device may execute an additional read operation.

SUMMARY

Various example embodiments may provide a memory device which may more accurately generate an improved or optimal read voltage by efficiently obtaining more cell count information by controlling a portion of bit lines in different bias states in a valley search operation for finding the improved or optimal read voltage.

According to various example embodiments, a memory device includes a memory cell array including a plurality of memory cells, a page buffer circuit connected to the plurality of memory cells through a plurality of bitlines and including a plurality of page buffers configured to sense a state of selected memory cells among the plurality of memory cells, and a row decoder connected to the plurality of memory cells through a plurality of wordlines and configured to apply first to third read voltages sequentially in a valley search operation to selected wordlines connected to the selected memory cells. The page buffer circuit is configured to set first bitlines and second bitlines to be in a first bias state and to set third bitlines and fourth bitlines to be in a second bias state different from the first bias state in the valley search operation. The page buffer circuit is configured to execute a sensing operation through the first bitlines and the third bitlines while the first read voltage is applied to the selected wordline, to execute a sensing operation through the first to the fourth bitlines while the second read voltage is applied to the selected wordline, and to execute a sensing operation through the second bitlines and the fourth bitlines while the third read voltage is applied to the selected wordline.

Alternatively or additionally according to various example embodiments, a memory device includes a cell region in which a plurality of memory cells are arranged, and a peripheral circuit region in which a row decoder is connected to the plurality of memory cells through a plurality of wordlines, a plurality of page buffers is connected to the plurality of memory cells through a plurality of bitlines, and a control logic configured to control the row decoder and the plurality of page buffers is arranged. The row decoder is configured to sequentially input a plurality of read voltages having different levels to a selected wordline among the plurality of wordlines. Each of the plurality of page buffers includes a sensing node connected to a corresponding one of the plurality of bitlines. Voltages of the sensing nodes included in a portion of the page buffers, among the plurality of page buffers, decrease differently while each of the plurality of read voltages is input to the selected wordline.

Alternatively or additionally according to various example embodiments, a memory device includes a cell region in which a plurality of memory cells are arranged, and a peripheral circuit region in which a row decoder is connected to the plurality of memory cells through a plurality of wordlines, a plurality of page buffers connected to the plurality of memory cells through a plurality of bitlines, and a control logic configured to control the row decoder and the plurality of page buffers are arranged. The control logic is configured to control the row decoder such that a plurality of read voltages having different levels are sequentially input to a selected wordline among the plurality of wordlines during a valley search operation. The plurality of page buffers include a first page buffer connected to a first bitline and second page buffer connected to a second bitline different from the first bitline. While a first read voltage among the plurality of read voltages is input to the selected wordline, a current input to the first bitline by the first page buffer is different from a current input to the second bitline by the second page buffer.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, various example embodiments will be described as follows with reference to the accompanying drawings.

Figure 1:
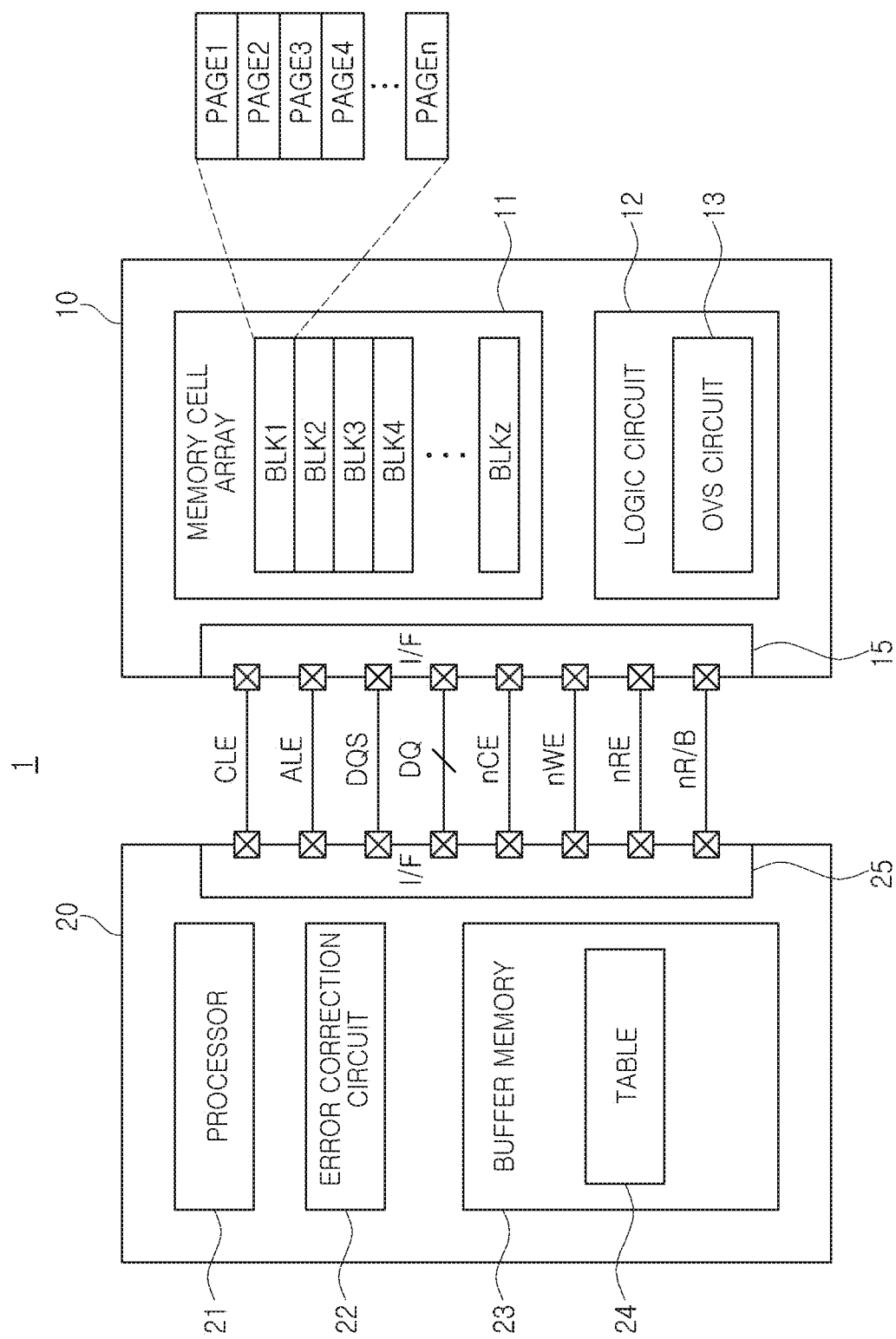
FIG. 1 is a plan diagram illustrating a memory system including a memory device according to various example embodiments.

FIG. 1 is a plan diagram illustrating a memory system including a memory device according to various example embodiments.

Referring to FIG. 1, a memory system 1 according to various example embodiments may include at least one memory device 10 and a memory controller 20. The memory device 10 may be implemented to or configured to store data. The memory device 10 may include one or more of a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), and the like. In some example embodiments, the memory device 10 may be implemented as a three-dimensional array structure.

The memory device 10 may include a memory cell array 11, a logic circuit 12, and a memory interface 15. The memory cell array 11 may include a plurality of memory blocks BLK1-BLKz. Each of the plurality of memory blocks BLK1-BLKz may include a plurality of pages PAGE1-PAGEn, and a plurality of memory cells may be included in each of the plurality of pages PAGE1-PAGEn. Each of the memory cells may store one or more bits, and for example, two or more bits of data may be stored in one memory cell, for example with a multi-level cell (MLC) memory cell and/or a triple-level cell (TLC) memory cell and/or a quad-level cell (QLC) memory cell.

The logic circuit 12 may control the memory cell array 11 in response to one or more control signals received from the memory controller 20 through the memory interface 15. For example, the logic circuit 12 may exchange control signals with the memory controller 20 when the chip enable signal nCE is in an enable state. The logic circuit 12 may obtain a command signal and/or an address signal that are included in a data signal DQ during an enable period of a command latch enable signal CLE and an address latch enable signal ALE. For example, the logic circuit 12 may obtain a command signal and/or an address signal from a data signal DQ at a toggle timing between a read enable signal nRE and a write enable signal nWE. The logic circuit 12 may execute a read operation, a program operation, and an erase operation with reference to a command signal and an address signal.

The logic circuit 12 may be synchronized with the data strobe signal DQS and may output read data as the data signal DQ, or may be synchronized with the data strobe signal DQS and may obtain write data included in the data signal DQ. As an example, before outputting read data, the logic circuit 12 or the memory interface 15 may generate a data strobe signal DQS by referring to the read enable signal nRE. The memory interface 15 may output read data through a data signal DQ synchronized with a data strobe signal DQS. In some example embodiments, the logic circuit may transmit a state of the memory device 10 to the memory controller 20 using a ready/busy signal nR/B.

In some example embodiments, the logic circuit 12 may include a valley search circuit such as an OVS circuit 13. The OVS circuit 13 may be a circuit configured execute a valley search operation for determining a read voltage, such as a good or an optimal read voltage. A valley search operation executed by the OVS circuit 13 may be defined as an on-chip valley search operation executed in the memory device 10. A detailed description of the on-chip valley search operation may be understood with reference to KR 10-2019-0025359, US 2020-0098436, U.S. Pat. Nos. 10,090,046, 10,559,362, 10,607,708, and 10,629,259, the entire contents of which are incorporated herein by reference.

In the valley search operation, the logic circuit 12 may detect turning on/off states of selected memory cells connected to the selected wordline while applying a plurality of read voltages having different levels to the selected wordline. The logic circuit 12 may calculate cell count data according to the distribution of threshold voltage of the selected memory cells. The cell count data may be used to determine a read voltage such as the optimal read voltage in consideration the distribution of threshold voltage of the selected memory cells. For example, the logic circuit 12 may directly determine a good or an optimal read voltage using cell count data. Alternatively or additionally, the memory controller 20 may receive cell count data from the memory device 10, may determine a good or an optimal read voltage based on the received cell count data, and may transmit the result to the memory device 10.

The memory controller 20 may include a processor 21, an error correction circuit 22, a buffer memory 23 and a controller interface 25. The processor 21 may control overall operations of the memory controller 20, and may generate a command signal and an address signal for controlling the memory device 10. The controller interface 25 may be connected to the memory interface 15 through control pins and data pins. Control signals such as one or more of a command latch enable signal CLE, an address latch enable signal ALE, a data strobe signal DQS, a chip enable signal nCE, a read enable signal nRE, a write enable signal new, and a ready/busy signal nR/B through control pins, and a data signal DQ may be transmitted through data pins.

The error correction circuit 22 may generate an error correction code in a program operation and may identify pr correct an error in read data received from the memory device 10 using the error correction code in a read operation. The error correction circuit 22 may correct an error using one or more of a low density parity check (LDPC) code, a BCH code, a turbo code, a Reed-Solomon code, a convolution code, a recursive systematic code (RSC), trellis-coded modulation (TCM), block coded modulation (BCM); however, example embodiments are not limited thereto.

The buffer memory 23 may store the table 24. For example, in table 24, data necessary or used to determine the good or optimal read voltage may be written considering one or more an elapsed time after programming, the temperature of the memory device 10, program/erase cycles, and the address of the selected memory cell, either linearly or non-linearly. For example, when error correction of read data obtained by executing a read operation on a selected memory cell at a specific address fails, the memory device 10 may execute a valley search operation, and the memory device 10 and/or the memory controller 20 may determine the read voltage. The read voltage may be written in the table 24, and when the read operation for the same selected memory cell is executed again, the memory controller 20 may instruct the memory device 10 to execute a read operation with an read voltage stored in the table 24.

In example embodiments, the buffer memory 24 may include a machine learning model. The machine learning model may be trained in advance to receive cell count data generated in the valley search operation and to output an optimal read voltage.

Figure 2:
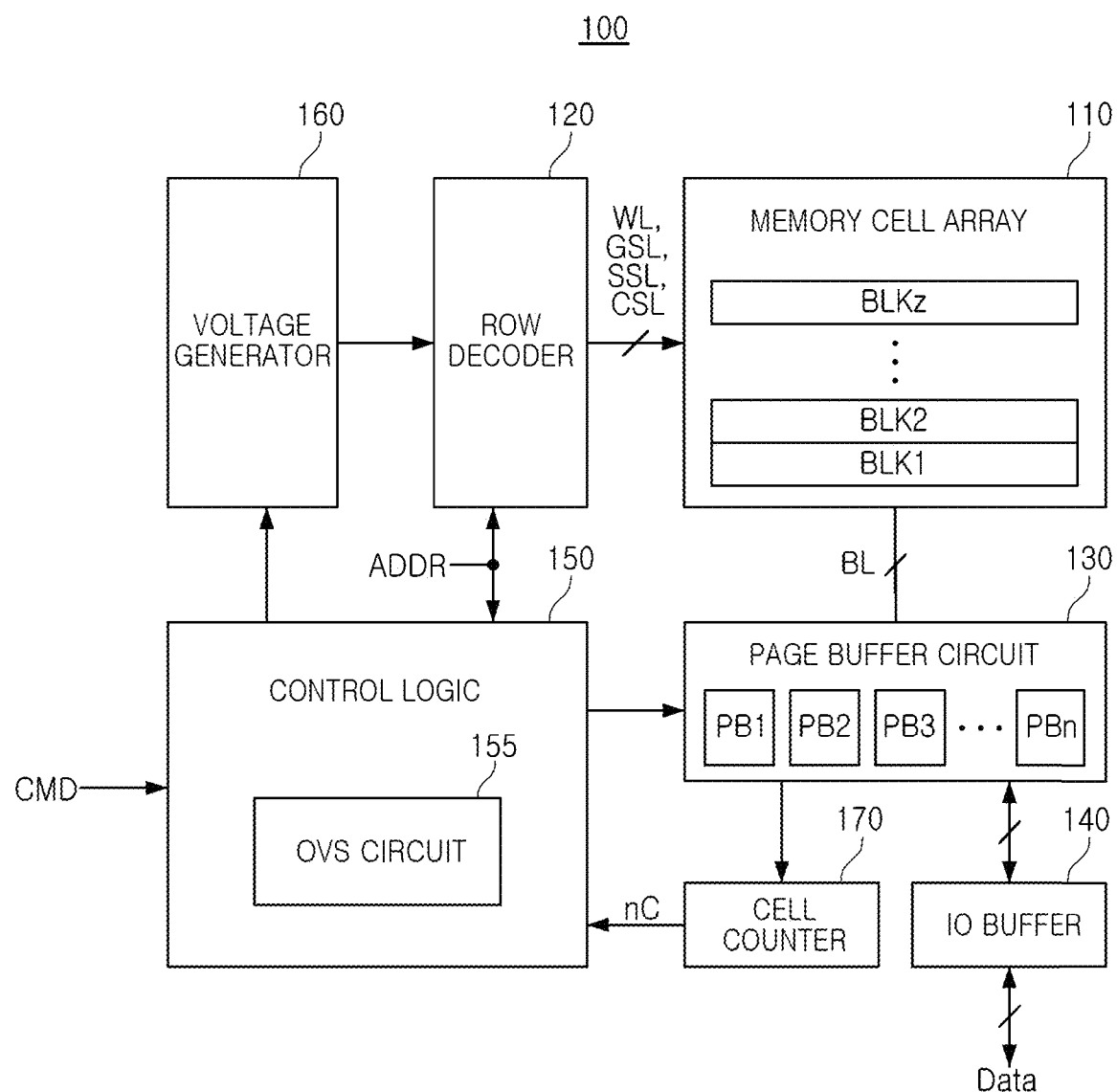
FIG. 2 is a diagram illustrating a memory device according to various example embodiments.

FIG. 2 is a diagram illustrating a memory device according to various example embodiments.

Referring to FIG. 2, the memory device 100 may include a memory cell array 110, a row decoder 120, a page buffer circuit 130, an IO (input/output) buffer 140, a control logic 150, a voltage A generator 160, and a cell counter 170. As an example, the memory device 100 according to various example embodiments illustrated in FIG. 2 may be a NAND flash memory. The memory cell array 110 may be disposed in the cell region, and the row decoder 120, the page buffer circuit 130, the IO buffer 140, the control logic 150, the voltage generator 160, and the cell counter 170 may be disposed in a peripheral circuit region.

The memory cell array 110 may be connected to the row decoder 120 through wordlines WL or select lines SSL and GSL. The memory cell array 110 may be connected to the page buffer circuit 130 through bitlines BL. The memory cell array 110 may include a plurality of cell strings. Each channel of the cell strings may be formed in a vertical or horizontal direction, and each of the cell strings may include a plurality of memory cells. Cell strings in the memory cell array 110 may be divided into a plurality of memory blocks BLK1-BLKz.

The row decoder 120 may select at least one of the memory cells of the memory cell array 110 in response to an address ADDR. The row decoder 120 may determine at least one selected wordline among wordlines WL in response to the address ADDR. The row decoder 120 may transmit a bias voltage for executing a program operation, a read operation, and an erase operation to a selected wordline among the wordlines WL. During the program operation, the row decoder 120 may apply a program voltage and a verification voltage to selected wordlines, and may apply pass voltages to non-selected wordlines. During a read operation, the row decoder 120 may apply a read voltage to selected wordlines and apply a read pass voltage to non-selected wordlines.

The page buffer circuit 130 may operate as a write driver or a sense amplifier. During a program operation, the page buffer circuit 130 may apply a bitline voltage corresponding to data to be programmed to a selected bitline among the bitlines BL of the memory cell array 110. During a read operation or a verification operation, the page buffer circuit 130 may sense data stored in the selected memory cell through the selected bitline. Each of the plurality of page buffers PB1-PBn included in the page buffer circuit 130 may be connected to at least one bitline.

Each of the plurality of page buffers PB1-PBn may be implemented to execute a valley search operation. Each memory cell may have one of a plurality of states according to written data, and each of the plurality of states may be defined according to a threshold voltage of each memory cell. Each of the plurality of page buffers PB1-PBn may execute a sensing operation multiple times to identify the state of the selected memory cells under control of the control logic 150. Also, the plurality of page buffers PB1-PBn may store pieces of data obtained through a plurality of sensing operations, respectively, and may select one pieces of data under control of the control logic 150. Also, each of the plurality of page buffers PB1 to PBn may select or output optimal data from among a plurality of pieces of sensed data under control of the control logic 150.

The IO buffer 140 may provide external data to the page buffer circuit 130. Also, the IO buffer 140 may provide a command CMD provided from an external entity to the control logic 150. The IO buffer 140 may provide an externally provided address ADDR to the control logic 150 and/or the row decoder 120. Also, the IO buffer 140 may output data sensed and latched by the page buffer circuit 130 to an external entity.

The control logic 150 may control the row decoder 120, the page buffer circuit 130, and the voltage generator 160 in response to a command CMD transmitted from an external entity. Also, the control logic 150 may include an OVS circuit 155 configured to execute a valley search operation. The OVS circuit 155 may control the page buffer circuit 130 and the voltage generator 160 for the valley search operation. The OVS circuit 155 may control the page buffer circuit 130 to execute a plurality of sensing operations to identify a specific state of selected memory cells. Also, the OVS circuit 155 may store sensing data corresponding to a plurality of sensing results in a plurality of latch sets provided in the plurality of page buffers PB1-PBn, respectively.

Also, the OVS circuit 155 may store detection data generated by an OVS operation. The detection data may include cell count data nC generated in the OVS operation. The OVS circuit 155 may output the detection data to an external memory controller. In various example embodiments, the detection data may be output in response to a special command transmitted by a memory controller, for example, a get feature command and/or a status read command. The detection data may be stored in the memory controller and may be used to determine the read voltage by modifying the level of the read voltage. In some example embodiments, the control logic 150 may determine a read voltage using the detection data.

The cell counter 170 may be implemented to count memory cells having a threshold voltage in a specific range. For example, the cell counter 170 may count the number of memory cells having a threshold voltage in a specific range by processing data stored in each of the plurality of page buffers PB1-PBn.

In various example embodiments, while the valley search operation is executed, bitlines BL may be divided into a plurality of groups, and bitlines BL included in different groups may be set to different bias states. Also, in the valley search operation, the row decoder 130 may input a plurality of read voltages having different levels to the selected wordline in sequence.

By setting the bitlines BL of a portion to different bias states in or during the valley search operation, more pieces of cell count data nC may be obtained during the same time period. For example, by dividing bitlines BL into an N number of groups (N is a natural number greater than 4), and inputting read voltages having an M number of different levels, where M may be smaller than N (M is a natural number smaller than N and larger than 2) into the selected wordline, an N number of pieces of cell count data nC may be obtained without increasing the time required for the valley search operation. Accordingly, an optimal read voltage may be more accurately determined, and reliability and performance of the memory device 100 may be improved.

Also, in various example embodiments, read voltages of which the number is smaller than N may be input to the selected wordline and an N number of pieces of cell count data nC may be obtained. Accordingly, in the valley search operation, more pieces of cell count data nC than the number of read voltages input to the selected wordline may be obtained.

Any or all of the elements described with reference to FIG. 1 and/or FIG. 2 may communicate with any or all other elements described with reference to FIG. 1 and/or FIG. 2. For example, any element may engage in one-way and/or two-way and/or broadcast communication with any or all other elements in FIG. 1 and/or FIG. 2, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Figure 3:
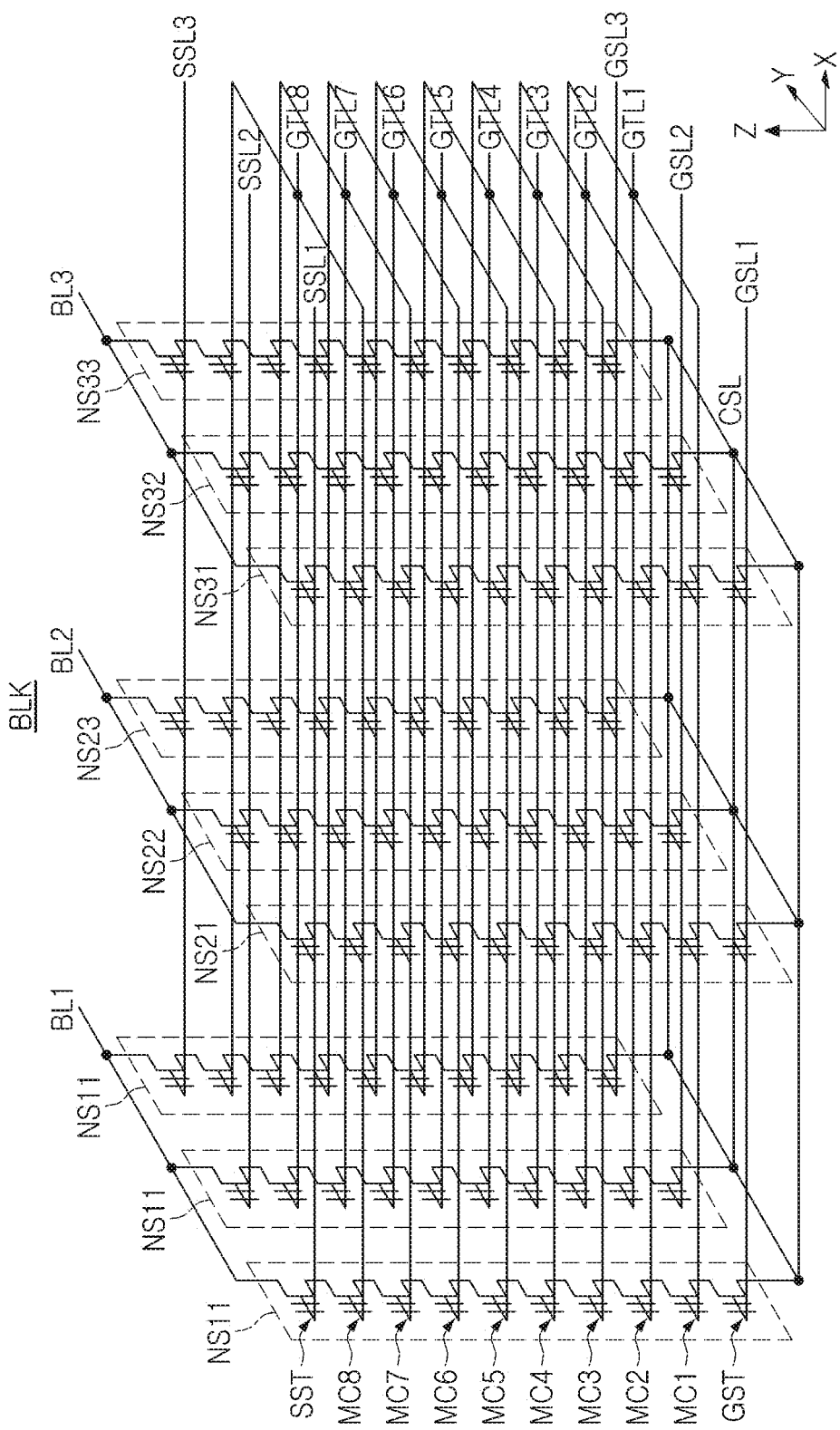
FIG. 3 is a circuit diagram illustrating a memory cell array included in a memory device according to various example embodiments.

FIG. 3 is a circuit diagram illustrating a memory cell array included in a memory device according to various example embodiments.

FIG. 3 may be a diagram illustrating a 3D V-NAND structure applicable to a memory device of a memory system according to various example embodiments. When the memory device is implemented as a 3D V-NAND type flash memory, a portion of memory cells included in each of a plurality of memory blocks in a memory cell array may be represented as an equivalent circuit as illustrated in FIG. 3. Example embodiments are not limited to a 3D V-NAND structure, however.

A memory block BLK illustrated in FIG. 3 may represent a three-dimensional memory block formed in a three-dimensional structure on a substrate. For example, a plurality of memory NAND strings NS11-NS13, NS21-NS23, and NS31-NS33 included in a memory block BLK may be formed in a direction perpendicular to the substrate.

Referring to FIG. 3, the memory block BLK may include a plurality of memory NAND strings NS11-NS13, NS21-NS23, and NS31-NS33 connected between bitlines BL1-BL3 and a common source line CSL. Each of the plurality of memory NAND strings NS11-NS13, NS21-NS23, and NS31-NS33 may include a string select transistor SST, a plurality of memory cells MC1-MC8 and a ground select transistor GST. FIG. 3 illustrates the example in which each of the plurality of memory NAND strings NS11-NS13, NS21-NS23, and NS31-NS33 may include eight memory cells MC1-MC8, but various example embodiments thereof is not limited thereto.

The string select transistor SST may be connected to corresponding string select lines SSL1-SSL3. A plurality of memory cells MC1-MC8 may be connected to corresponding gate lines GTL1-GTL8, respectively. The gate lines GTL1-GTL8 may be wordlines, and a portion of the gate lines GTL1-GTL8 may be dummy wordlines, e.g., wordlines that are not actively connected during operation of the memory device. Ground select transistors GST may be connected to corresponding ground select lines GSL1-GSL3. String select transistors SST may be connected to corresponding bitlines BL1-BL3, and ground select transistors GST may be connected to a common source line CSL.

In various example embodiments, in a block BLK, wordlines on the same level (same vertical level) may be connected in common, and ground select lines GSL1-GSL3 and string select lines SSL1-SSL3 may be separated from each other. In FIG. 3, the memory block BLK may be connected to eight gate lines GTL1-GTL8 and three bitlines BL1-BL3, but various example embodiments thereof is not limited thereto. In some example embodiments, the number of gate lines and bitlines may be greater than or less than the example illustrated in FIG. 3.

Figure 4A:
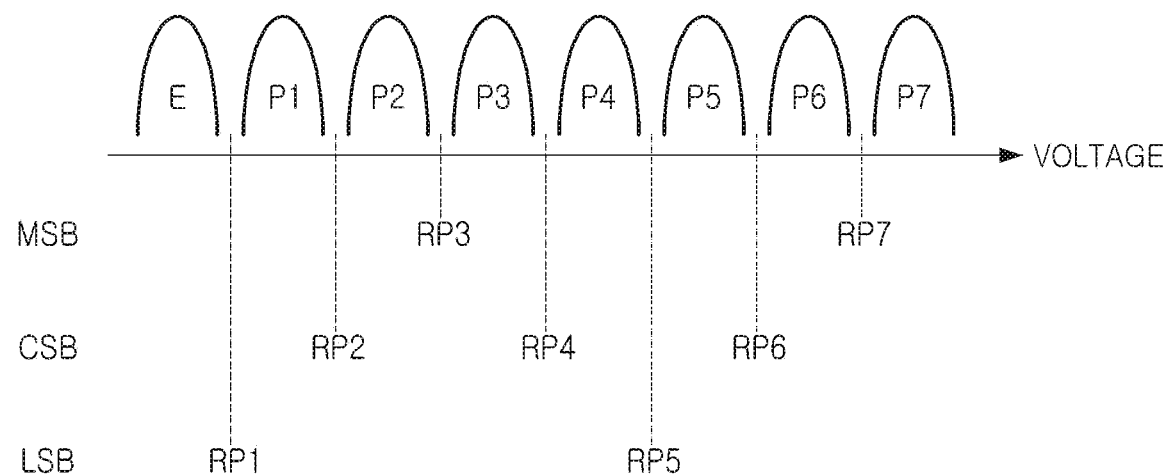
FIGS. 4A and 4B are diagrams illustrating operations of a memory device according to various example embodiments.
Figure 4B:
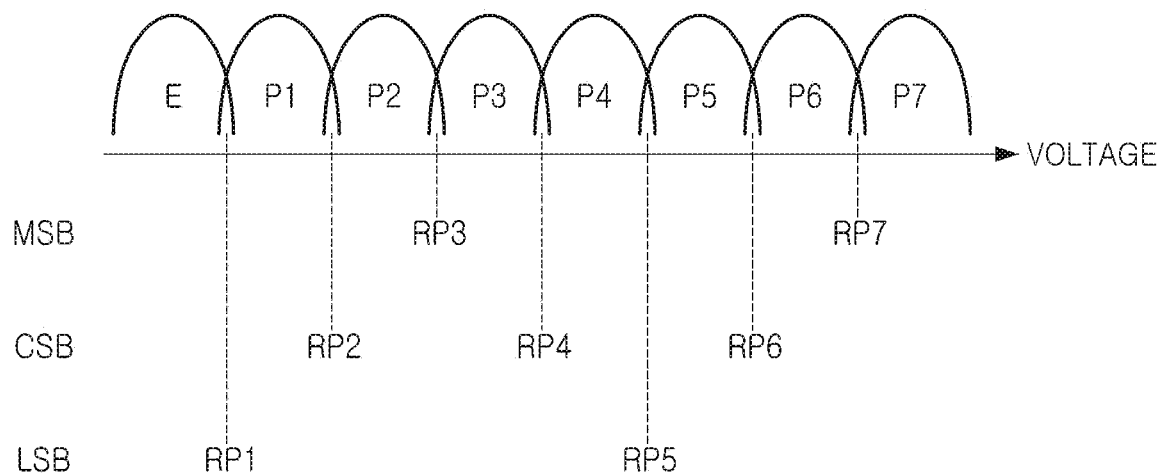

FIGS. 4A and 4B are diagrams illustrating operations of a memory device according to various example embodiments.

In some example embodiments for example as illustrated in FIGS. 4A and 4B, each of the memory cells of the memory device may be programmed by a triple level cell (TLC) method to store 3 bits of data. Each of the memory cells may have one of eight states E-P7 depending on the written data, e.g., eight is equal to two cubed.

Referring to FIGS. 4A and 4B, to determine the data stored in each of the memory cells, up to a maximum of three read operations may be executed, and eight pieces of state data may be output to three pages in a divided manner. In various example embodiments, the erase state E may be allocated as data "111," the first program state P1 may be allocated as data "110," the second program state P2 may be allocated as data "100," the third program state P3 may be allocated as data "000," the fourth program state P4 may be allocated as data "010," the fifth program state P5 may be allocated as data "011," the sixth program state P6 may be allocated as data "001" and the seventh program state P7 may be allocated as data "101." However, this is merely descriptive of various example embodiments, and pieces of data allocated to each state E-P7 of memory cells in various example embodiments may be different.

For example, the read operation of the least significant bit LSB may include a first read operation using the first read voltage RP1 between the erase state E and the first program state P1, and a second read operation using a fifth read voltage RP5 between the fourth program state P4 and the fifth program state P5. Similarly, the read operation of the most significant bit MSB may include a first read operation using the third read voltage RP3 between the second program state P2 and the third program state P3, and a second read operation using a seventh read voltage RP7 between the sixth program state P6 and the seventh program state P7. The read operation of the central significant bit CSB may include a first read operation using the second read voltage RP2 between the first program state P1 and the second program state P2, a second read operation using a fourth read voltage RP4 between the third program state P3 and the fourth program state P4, and a third read operation using a sixth read voltage RP6 between the fifth program state P5 and the sixth program state P6.

In some ideal situations, the distribution of threshold voltage of memory cells may be as illustrated in FIG. 4A. In this case, an error may not be included in the read data obtained from the memory cells using the read voltages RP1-RP7, or an error correction circuit may correct the error. As illustrated in FIG. 4B, however, the distribution of threshold voltage of memory cells may deteriorate depending on one or more of the time elapsed after the program operation, changes in the operating temperature of the memory device, and the accumulation of counts of execution of a program/erase operation and a read operation.

Referring to FIG. 4B, distributions of threshold voltages may overlap each other in at least a portion of states E-P7, or at least some distributions may overlap at least some other distributions. In this case, when the read operation is executed using the read voltages RP1-RP7 as are, the error correction circuit may fail to correct the error of the read data. When the error correction circuit of the memory controller receiving the read data fails to execute the error correction, the memory device may execute a valley search operation. In the valley search operation, read voltages of different levels may be input to the selected wordline, and cell count data may be generated in a voltage range in which distributions of threshold voltages overlap each other. The memory device and/or the memory controller may determine the read voltage such as the optimal read voltage which may accurately determine the states E-P7 of a portion in which the distributions of threshold voltages overlap using the cell count data, and may execute the read operation using the optimal read voltage again, thereby accurately generating the read data.

Figure 5A:
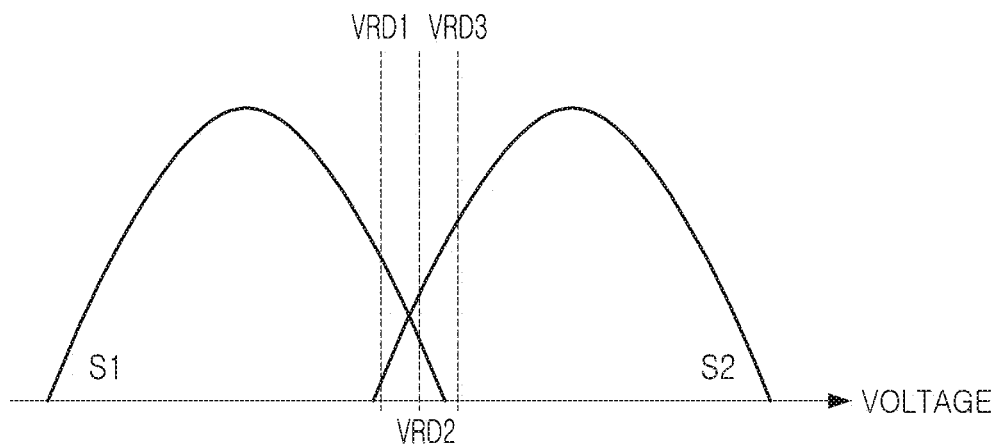
FIGS. 5A and 5B are diagrams illustrating a valley search operation of a memory device according to various example embodiments.
Figure 5B:
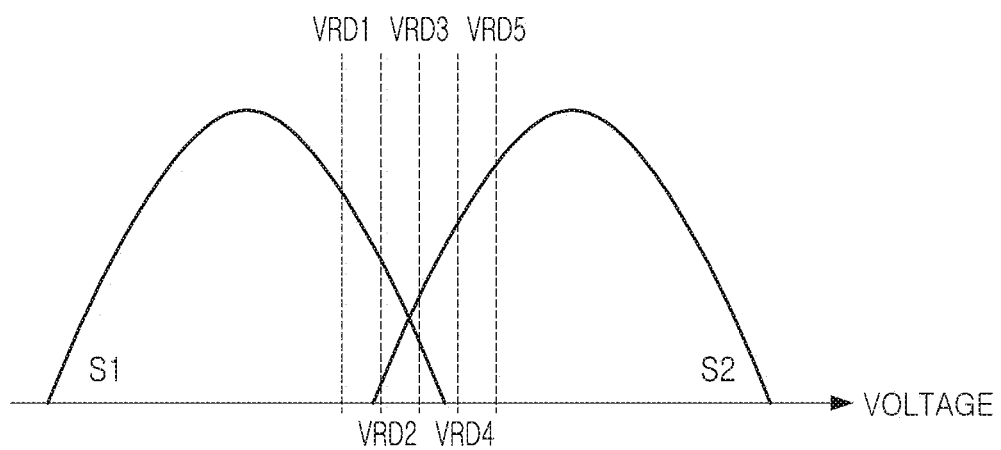

FIGS. 5A and 5B are diagrams illustrating a valley search operation of a memory device according to various example embodiments.

Referring to FIGS. 5A and 5B, the distribution of threshold voltage of memory cells programmed in the first state S1 may partially overlap the distribution of threshold voltage of memory cells programmed in the second state S2. Accordingly, error correction for read data obtained from the selected memory cells by executing general read operation may fail. The memory device may execute a valley search operation in response to a request from the memory controller which has failed the error correction.

In the valley search operation described with reference to FIG. 5A, first to third read voltages VRD1-VRD3 having different levels may be input to the selected wordline, e.g., in sequence or in increasing sequence or linearly. For example, the first read voltage VRD1 may have the lowest level and the third read voltage VRD3 may have the highest level. While the row decoder inputs the first and third read voltages VRD1-VRD3 to the selected wordline in sequence, a sensing operation may be executed multiple times on the bitlines connected to a memory block including the selected memory cells.

First cell count data, which is the number of selected memory cells having a threshold voltage between the first read voltage VRD1 and the second read voltage VRD2 by executing a sensing operation multiple times, and second cell count data, which is the number of selected memory cells having a threshold voltage between the second read voltage VRD2 and third read voltage VRD3 may be calculated. The memory device or the memory controller may calculate an optimal read voltage using the first cell count data and the second cell count data, and the memory device may execute a read operation again using the optimal read voltage.

Meanwhile, in the valley search operation described with reference to FIG. 5B, the first to fifth read voltages VRD1-VRD5 having different levels may be input to the selected wordline in sequence. For example, the first read voltage VRD1 may have the lowest level and the fifth read voltage VRD5 may have the highest level. While the row decoder inputs the first to fifth read voltages VRD1-VRD5 to the selected wordline in sequence, a sensing operation may be executed multiple times on bitlines connected to a memory block including selected memory cells.

In various example embodiments illustrated in FIG. 5B, four pieces of cell count data may be generated by a plurality of sensing operations. The first cell count data may be the number of selected memory cells having a threshold voltage between the first read voltage VRD1 and the second read voltage VRD2, and the second cell count data may be the number of selected memory cells having a threshold voltage between the second read voltage VRD2 and the third read voltage VRD3. The third cell count data may be the number of selected memory cells having a threshold voltage between the third read voltage VRD3 and the fourth read voltage VRD4, and the fourth cell count data may be the number of selected memory cells having a threshold voltage between the fourth read voltage VRD4 and the fifth read voltage VRD5.

As compared to various example embodiments illustrated in FIG. 5A, in an example illustrated in FIG. 5B, a good or an optimal read voltage may be determined using more pieces of cell count data, and accordingly, the accuracy of a valley search operation may be improved. However, to obtain more pieces of cell count data, a larger number of read voltages VRD1-VRD5 may need to be applied to the selected wordline, and a larger number of sensing operations may need to be executed. Accordingly, in the example embodiment illustrated in FIG. 5B, the time required or used for the valley search operation may increase.

In various example embodiments, by controlling at least a portion of the bitlines to have different bias states during the valley search operation, more pieces of cell count data may be obtained without increasing or with a reduction in an increase in the time required for the valley search operation. For example, by controlling at least a portion of the bitlines to have different bias states, first to fourth pieces of cell count data as described with reference to FIG. 5B may be obtained while only a portion of the first to fifth read voltages VRD1-VRD5 may be applied to the selected wordline in sequence, and first to fourth as described with reference to FIG. 5B. Accordingly, efficiency and/or accuracy of the valley search operation may be simultaneously improved.

In various example embodiments, an operation of determining a good or an optimal read voltage using the first to fourth pieces of cell count data may be executed in a memory device. As an example, assuming the memory device 100 described with reference to FIG. 2, a logic circuit for executing an operation of determining an optimal read voltage may be implemented in the control logic 150.

The logic circuit in the control logic 150 may generate a function such as a polynomial function representing the distribution of threshold voltage of selected memory cells using four or more pieces of cell count data, and may calculate a good or the optimal read voltage corresponding to the valley according to the distribution of threshold voltage using the function. For example, the logic circuit may calculate a probability density function according to the distribution of threshold voltage based on pieces of cell count data, may find a point at which the slope is 0 or close to 0 and may calculate a good or an optimal read voltage. When the read voltage is determined, the memory device 100 may input the good or the optimal read voltage to the selected wordline to which selected memory cells are connected and may execute the read operation again.

Figure 6:
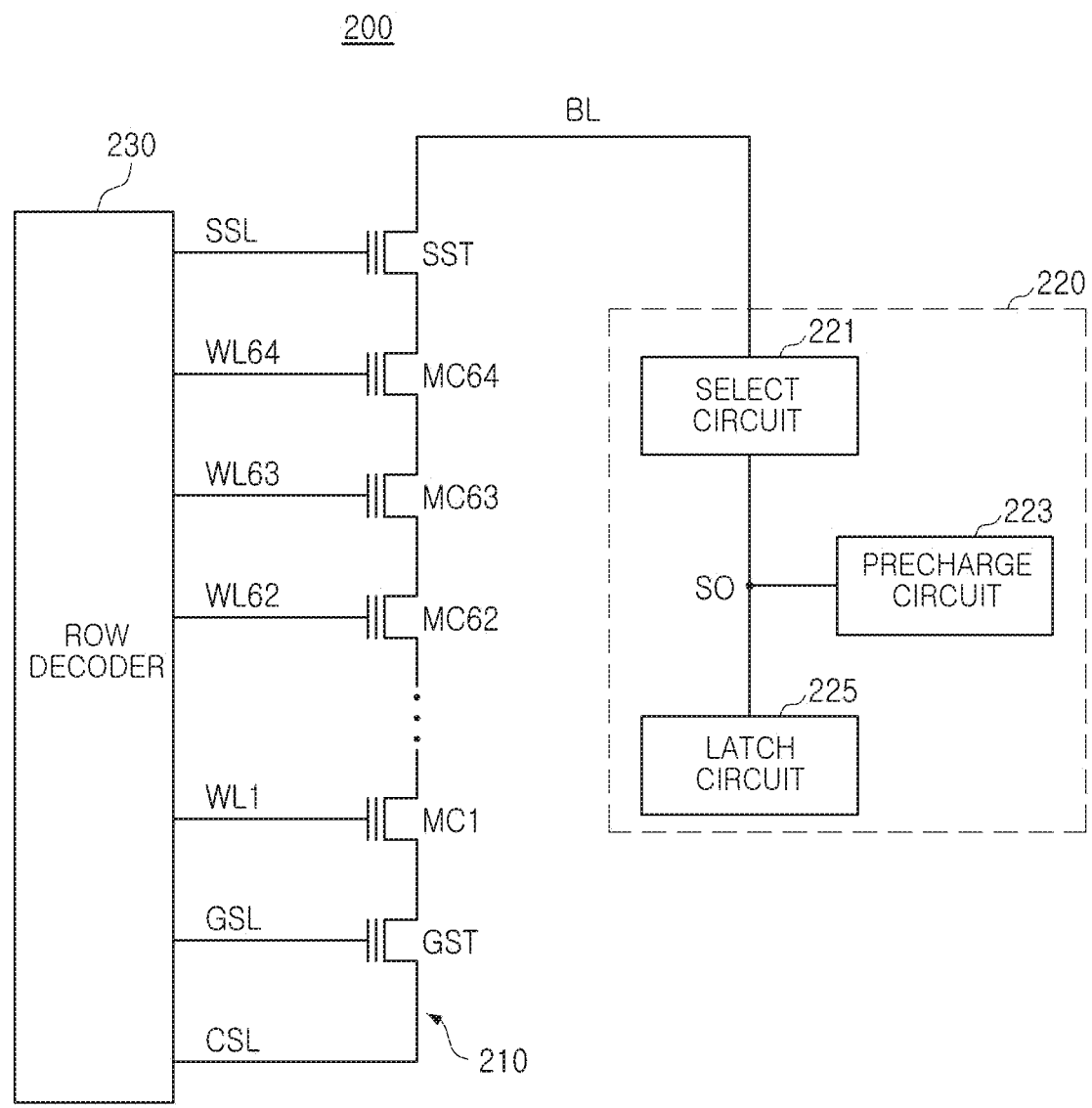
FIGS. 6 to 8 are diagrams illustrating operations of a memory device according to various example embodiments.
Figure 7:
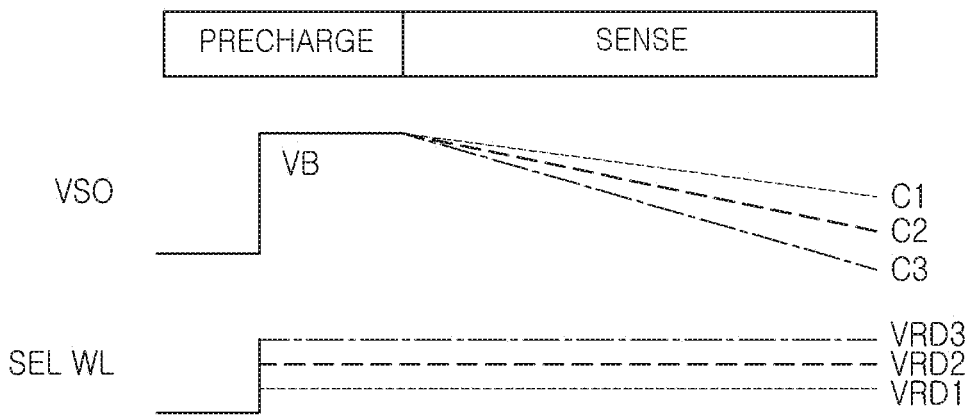
Figure 8:
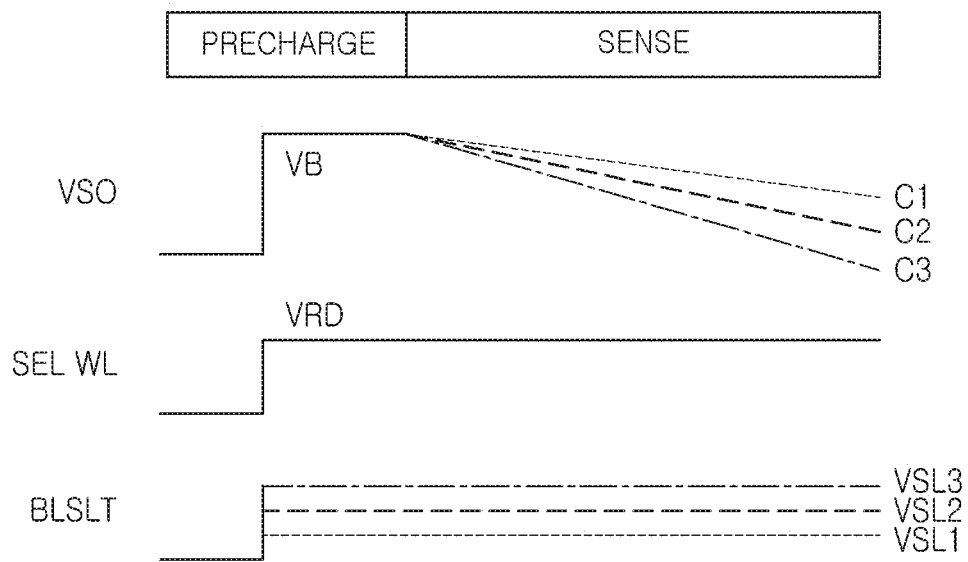

FIGS. 6 to 8 are diagrams illustrating operations of a memory device according to various example embodiments.

FIG. 6 may be a diagram illustrating a portion of components included in the memory device 200 according to various example embodiments. Referring to FIG. 6, a memory device 200 according to various example embodiments may include a memory cell array 210, a page buffer 220, and a row decoder 230. In the memory cell array 210, a plurality of memory cells MC1-MC64, a ground select transistor GSL, and a string select transistor SSL may be connected to each other and may form a memory cell string. The number of memory cells MC1-MC64 included in one memory cell string may be varied depending on various example embodiments.

The page buffer 220 may be connected to a memory cell string through a bitline BL. The page buffer 220 may include a select circuit 221, a precharge circuit 223 and a latch circuit 225, and the sensing node SO of the page buffer 220 may be connected to the bitline BL by the select circuit 221.

The row decoder 230 may be connected to a memory cell string through wordlines WL1-WL64, a ground select line GSL, a string select line SSL and a common source line CSL.

Hereinafter, a valley search operation of the memory device 200 will be described with reference to FIGS. 7 and 8 together. As described above, the valley search operation may be a general read operation, an operation executed by the memory device 200 to determine a good or an optimal read voltage when error correction for read data obtained from the selected memory cell WL63 fails.

When the valley search operation starts, the precharge circuit 233 of the page buffer 220 may increase the sensing node voltage VSO to a bias voltage such as a dynamically determined (or, alternatively, predetermined) bias voltage VB during the precharge period. The row decoder 230 may input a predetermined read voltage to a selected wordline SEL WL selected from the wordlines WL1-WL64. The row decoder 230 may input a pass voltage to the other non-selected wordlines other than the selected wordline SEL WL.

The pass voltage may turn on the memory cells MC1-MC64 regardless of the threshold voltage of the memory cells MC1-MC64, and the read voltage may identify data stored in the memory cells MC1-MC64. Accordingly, a magnitude of a current flowing through the selected memory cell may be determined according to a magnitude relationship between a read voltage input to the selected wordline SEL WL and a threshold voltage of the selected memory cell. The entirety of the other non-selected memory cells may be turned on by the pass voltage.

Referring to FIG. 7, when a first read voltage VRD1 is input to the selected wordline SEL WL, the magnitude of a current flowing through the selected memory cell may be low, or the smallest. Accordingly, in the sensing period, the sensing node voltage VSO may have a first decreasing trend C1 at a first slope having a first magnitude (first absolute magnitude). When the second read voltage VRD2 greater than the first read voltage VRD1 is input to the selected wordline SEL WL, in the sensing period, the sensing node voltage VSO may have a second decreasing trend C2 at a second slope having a second magnitude (second absolute magnitude) faster than or greater than the first decreasing trend C1. When a third read voltage VRD3 greater than the second read voltage VRD2 is input to the selected wordline SEL WL, the sensing node voltage VSO may have a third decreasing trend C3 or slope faster than (greater in absolute value of magnitude than) the second decreasing trend C2. Although the trends C1-C3 are illustrated as linear, example embodiments are not necessarily limited thereto.

The cell count data as described above with reference to FIG. 5A may be obtained by inputting first to third read voltages VRD1-VRD3 to the selected wordline SEL WL in sequence and executing the sensing operation three times. In the valley search operation, more pieces of cell count data may be needed or used to determine more accurately the good or optimal read voltage. In various example embodiments, instead of increasing the number of read voltages VRD1-VRD3, by controlling the bias state of the bitline BL, more pieces of cell count data may be obtained with a valley search operation executed during the same period of time.

In the valley search operation described with reference to FIG. 8, a sensing node voltage VSO may be precharged with a bias voltage VB, and a read voltage VRD may be input to the selected wordline SEL WL. However, in various example embodiments illustrated in FIG. 8, the level of the bitline select signal BLSLT input to the select circuit 221 of the page buffer 220 may be adjusted instead of the level of the read voltage VRD.

For example, the select circuit 221 may include at least one select transistor, and a bitline select signal BLSLT may be input to a gate of the select transistor. When the bitline select signal BLSLT is the first select level VSL1, the magnitude of a current flowing from the sensing node SO to the bitline BL may be determined to be small. Accordingly, as illustrated in FIG. 8, the sensing node voltage VSO may have the slowest first decreasing trend C1 or first decreasing slope.

When the bitline select signal BLSLT is the second select level VSL2 higher than the first select level VSL1, the current flowing from the sensing node SO to the bitline BL may increase relatively, and the sensing node voltage VSO may have a second decreasing trend C2 faster than the first decreasing trend C1. When the bitline select signal BLSLT is the third select level VSL3, the current flowing from the sensing node SO to the bitline BL may be determined to be larger, and the sensing node voltage VSO may have a third decreasing trend C3 or slope faster than the second decreasing trend C2 or slope.

As described with reference to FIG. 8, without changing the level of the read voltage VRD applied to the selected wordline SEL WL, by adjusting the bias state of the bitline BL, the decreasing trend or slope of sensing node voltage VSO may be adjusted. For example, by adjusting the bias state of the bitline BL, an effect of applying a read voltage VRD having a different level to the selected wordline SEL WL may be obtained. In various example embodiments, by controlling the bias state of bitline BL and the level of read voltage VRD applied to selected wordline SEL WL together, more pieces of cell count data may be obtained without increasing the time required for the valley search operation.

The bias state of the bitline BL may vary according to the level of the bitline select signal BLSLT input to the select circuit 221 as described with reference to FIG. 8. However, in some example embodiments, the bias state of the bitline BL may be controlled by adjusting the level of the bias voltage VB of the sensing node voltage VSO precharged in the precharge period.

Figure 9:
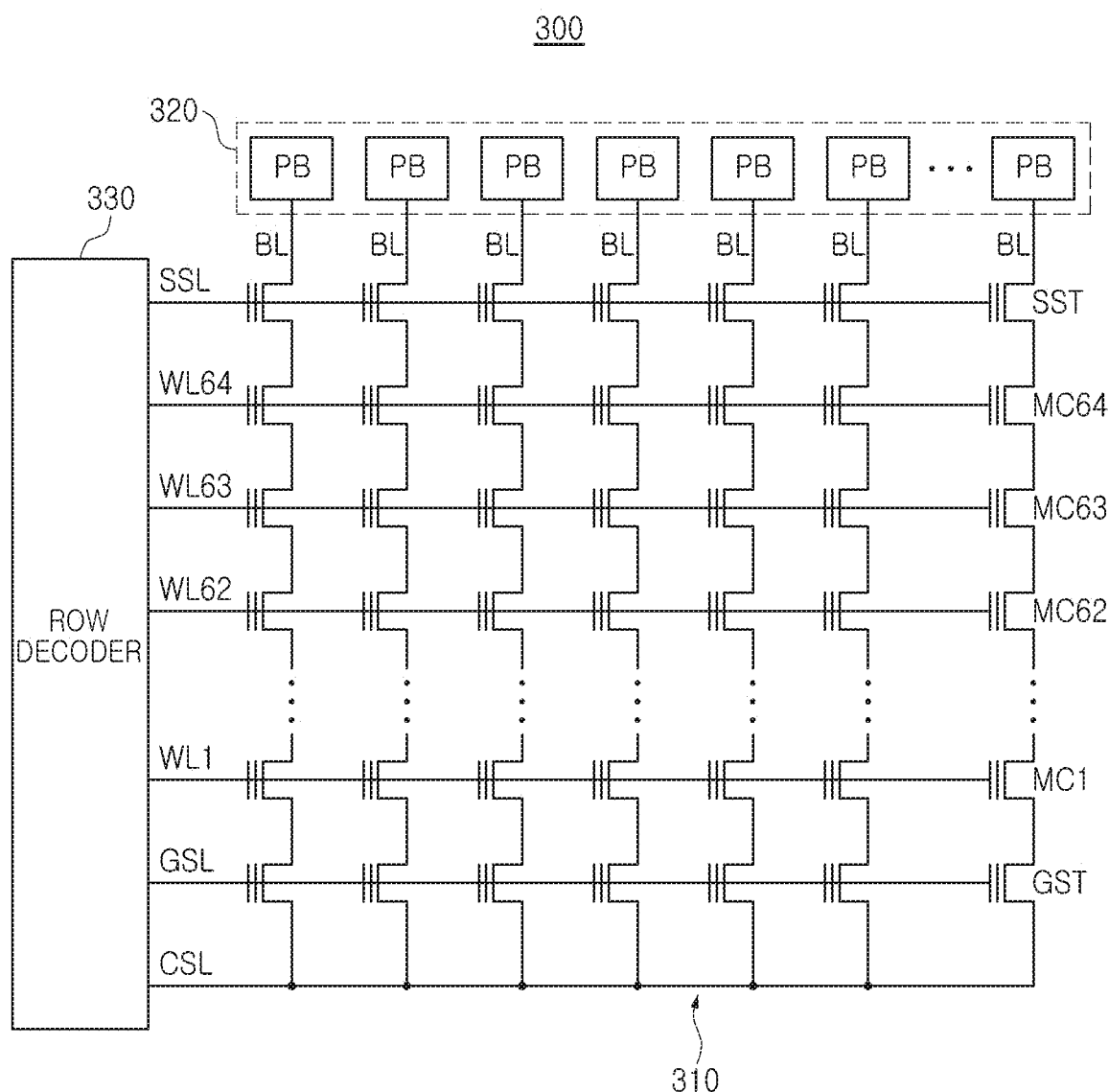
FIG. 9 is a diagram illustrating a memory device according to various example embodiments.
Figure 10:
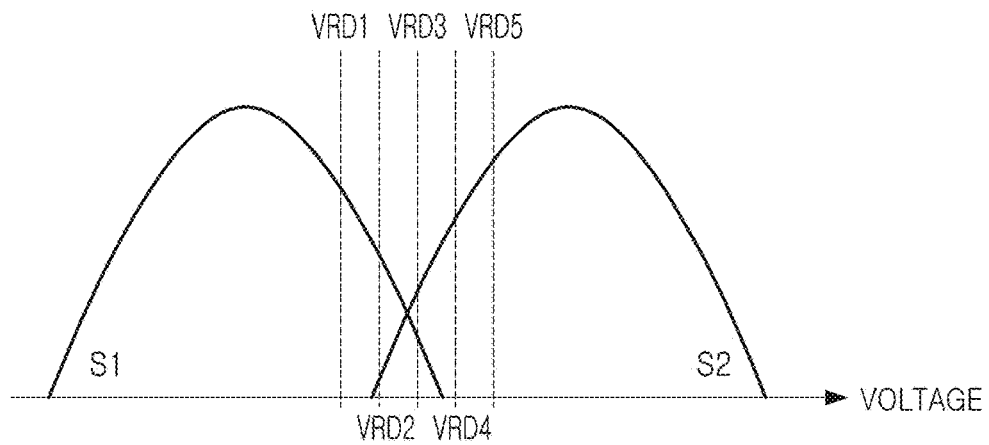
FIGS. 10 and 11 are diagrams illustrating operations of a memory device according to various example embodiments.
Figure 11:
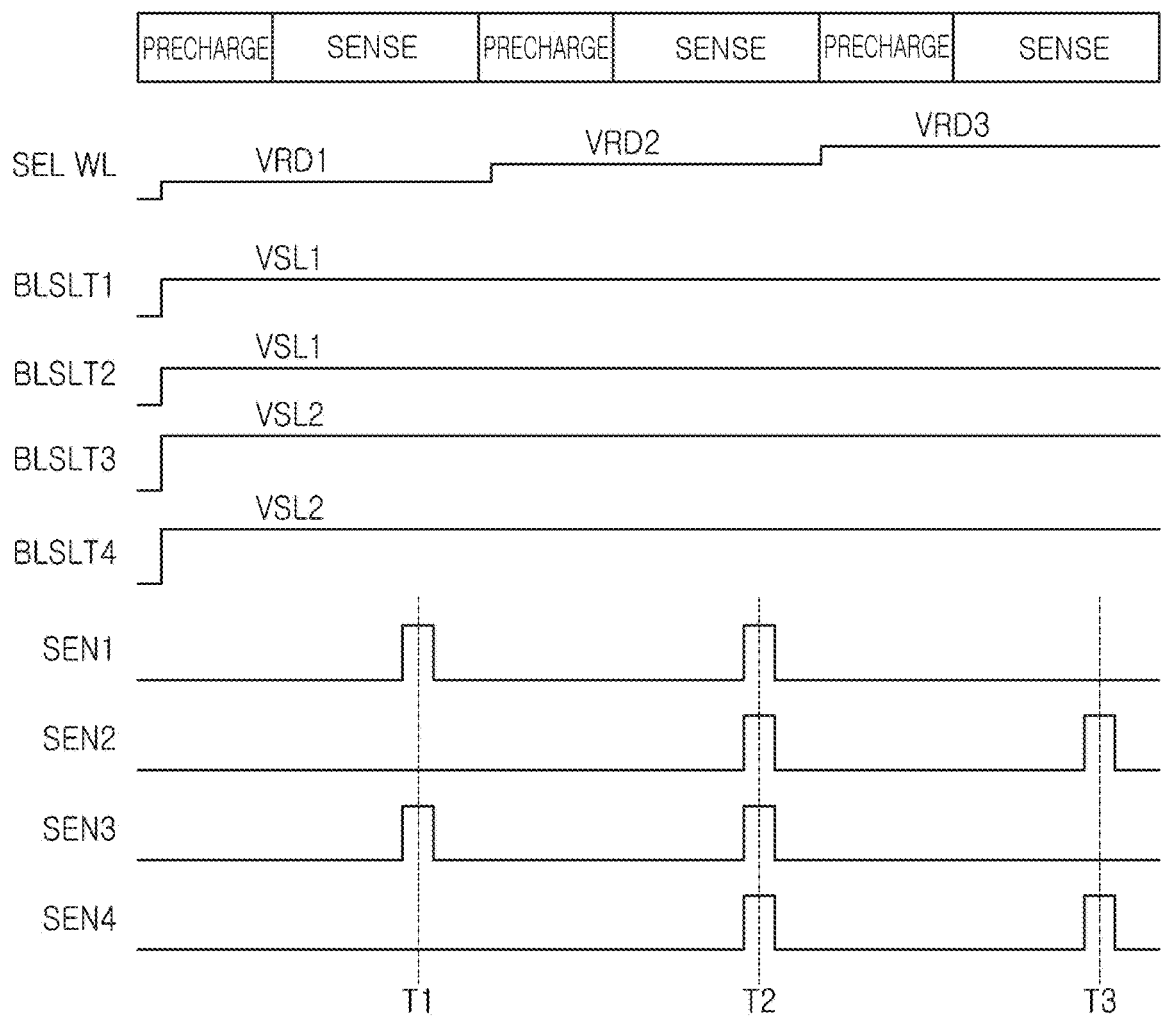

FIG. 9 is a diagram illustrating a memory device according to various example embodiments. FIGS. 10 and 11 are diagrams illustrating operations of a memory device according to various example embodiments.

Referring first to FIG. 9, a memory device 300 according to various example embodiments may include a memory cell array 310, a page buffer circuit 320 and a row decoder 330. The memory cell array 310 may include a plurality of memory cell strings, and each of the plurality of memory cell strings may include a plurality of memory cells MC1-MC64, a ground select transistor GSL, and a string select transistor SSL. The number of memory cells MC1-MC64 included in a memory cell string may be varied in different example embodiments.

The page buffer circuit 320 may include a plurality of page buffers PB, and the plurality of page buffers PB may be connected to a plurality of memory cell strings through bitlines BL. Each of the plurality of page buffers PB may include a select circuit, a precharge circuit, and a latch circuit as described above with reference to FIG. 6. The row decoder 330 may be connected to the memory cell array 310 through wordlines WL1-WL64, a ground select line GSL, a string select line SSL and a common source line CSL. For example, a plurality of memory cell strings included in the memory cell array 310 may be disposed in a memory block and may share the plurality of wordlines WL1-WL64.

When the read operation is executed, the row decoder 330 may input a read voltage to the selected wordline and may input a pass voltage to the other non-selected wordlines. In each of the plurality of page buffers PB, the precharge circuit may precharge the sensing node with a predetermined bias voltage, may develop the sensing node by connecting the sensing node to the bitline BL, and may store the data of each selected memory cell connected to the selected wordline in the latch circuit.

When the error correction of read data obtained in the read operation fails, the memory device 300 may execute a valley search operation. In various example embodiments, by inputting read voltages of different levels to selected wordlines in sequence and executing a sensing operation by setting a portion of bitlines BL to different bias states, an increase in the time required or used for the valley search operation may be reduced, and more pieces of cell count data may be generated. Accordingly, reliability and/or efficiency of the valley search operation may be improved, and an improved or optimal read voltage for selected memory cells may be more accurately determined using the cell count data. In the description below, the example embodiment will be described with reference to FIGS. 10 and 11 together.

Referring to FIGS. 10 and 11, in various example embodiments, the number of selected memory cells having a threshold voltage between a plurality of read voltages VRD1-VRD5 may be generated as cell count data. For example, first cell count data, which is the number of selected memory cells having a threshold voltage between the first read voltage VRD1 and the second read voltage VRD2, second cell count data, which is the number of selected memory cells with a threshold voltage between the second read voltage VRD2 and third read voltage VRD3, third cell count data, which is the number of selected memory cells with a threshold voltage between the third read voltage VRD3 and the fourth read voltage VRD4, and fourth cell count data, which is the number of selected memory cells with a threshold voltage between the fourth read voltage VRD4 and the fifth read voltage VRD5 may be generated as results of the valley search operation.

Generally, to generate first to fourth pieces of cell count data, it may be necessary or preferred to apply a plurality of read voltages VRD1-VRD5 to the selected wordline SEL WL in sequence and to execute a sensing operation multiple times. A sensing operation may be determined by a sensing signal input to each of a plurality of page buffers PB. In various example embodiments, by setting the bias state of a portion of bitlines BL differently along with the level of voltage applied to the selected wordline SEL WL, only a portion of the plurality of read voltages VRD1-VRD5 may be applied to the selected wordline SEL WL, and first to fourth pieces of cell count data may be obtained.

First, as illustrated in FIG. 11, a first read voltage VRD1 may be input to the selected wordline SEL WL. The memory device 300 may divide bitlines BL into four groups and may define the bitlines as first bitlines, second bitlines, third bitlines and fourth bitlines. The number of each of the first to fourth bitlines may be the same. Also, similarly to the bitlines BL, a plurality of page buffers PB may also be divided into first page buffers, second page buffers, third page buffers and fourth page buffers. In other words, each of the plurality of page buffers PB may be defined as one of a first page buffer, a second page buffer, a third page buffer and a fourth page buffer.

Referring to FIG. 11, the first bitline select signal BLSLT1 input to the select circuit of the first page buffers and the second bitline select signal BLSLT2 input to the select circuit of the second page buffers may be set to have a first select level VSL1. The third bitline select signal BLSLT3 input to the select circuit of the third page buffers and the fourth bitline select signal BLSLT4 input to the select circuit of the fourth page buffers may be set to have a second select level VSL2 higher than the first select level VSL1.

While the first read voltage VRD1 is applied to the selected wordline SEL WL, first page buffers and third page buffers may execute a sensing operation at a first time point T1. First page buffers may execute a sensing operation on first selected memory cells connected to the first bitlines in response to a first sensing signal SEN1, and third page buffers may execute a sensing operation on first selected memory cells connected to the third bitlines in response to a third sensing signal SEN3. The first selected memory cells and the third selected memory cells may be disposed on the same level, may be connected to the selected wordline SEL WL in common and may receive the first read voltage VRD1.

The first bitline select signal BLSLT1 of the first select level VSL1 may be input to each select circuit of the first page buffers, and the third bitline select signal BLSLT3 of the second select level VSL2 greater than the first select level VSL1 may be input to each select circuit of the third page buffers. For example, a difference between the first select level VSL1 and the second select level VSL2 may be determined depending on turning on/off characteristics of selected memory cells according to the voltage of bitlines BL and the voltage of sensing nodes connected to bitlines BL and included in page buffers (PB).

Accordingly, the magnitude of a current flowing in each of the third bitlines may be greater than the magnitude of a current flowing in each of the first bitlines, and the same effect as inputting a voltage greater than the voltage input to the first selected memory cells into the third selected memory cells may be obtained. Accordingly, the first page buffers may determine memory cells having a threshold voltage greater than (greater in absolute value than) the first read voltage VRD1 among first selected memory cells, and the third page buffers may determine memory cells having a threshold voltage greater than (greater in absolute value than) the third read voltage VRD3 among the third selected memory cells.

Thereafter, the row decoder may increase the voltage input to the selected wordline SEL WL from the first read voltage VRD1 to the second read voltage VRD2. While the second read voltage VRD2 is applied to the selected wordline SEL WL, the page buffers may execute a sensing operation at a second time point T2 in response to the sensing signals SEN1-SEN4.

The first page buffers may execute a sensing operation on the first selected memory cells connected to the first bitlines BL1 in response to the first sensing signal SEN1, and the second page buffers may execute a sensing operation on the second selected memory cells connected to the second bitlines in response to the second sensing signal SEN2. The third page buffers may execute a sensing operation on the third selected memory cells connected to the third bitlines in response to the third sensing signal SEN3, and the fourth page buffers execute the sensing operation on the fourth selected memory cells connected to the fourth bitlines in response to the fourth sensing signal SEN4. A sensing operation may be executed for. The first to fourth selected memory cells may be connected to the selected wordline SEL WL in common and may receive the second read voltage VRD2.

The first bitline select signal BLSLT1 of the first select level VSL1 may be input to each select circuit of the first page buffers, and the second bitline select signal BLSLT2 of the first select level VSL1 may be input to each select circuit of the second page buffers. The third bitline select signal BLSLT3 of the second select level VSL2 greater than the first select level VSL1 may be input to the select circuit of each of the third page buffers, and the fourth bitline select signal BLSLT4 of the second select level VSL2 may be input to a select circuit of each of the fourth page buffers.

As such, by setting a portion of the first to fourth bitline select signals BLSLT1-BLSLT4 to different levels while the second read voltage VRD2 is applied to the selected wordline SEL WL, a portion of the first to fourth bitlines may be controlled with different bias states. For example, the magnitude of a current flowing through each of the third bitlines and the fourth bitlines may be greater than (greater in absolute value than) the magnitude of a current flowing through each of the first bitlines and second bitlines. Accordingly, the same effect as inputting a higher voltage than the voltage input to first selected memory cells and second selected memory cells to third selected memory cells and fourth selected memory cells may be obtained.

At the second time point T2, the first page buffers may determine memory cells having a threshold voltage lower than the second read voltage VRD2 among the first selected memory cells, and the second page buffers may determine memory cells with a threshold voltage higher than the second read voltage VRD2. The third page buffers may determine memory cells having a threshold voltage lower than the fourth read voltage VRD4 among the third selected memory cells, and each of the fourth page buffers may determine memory cells having a threshold voltage higher than the fourth read voltage VRD4. In other words, by controlling a portion of the bitlines to different bias states, the page buffers PB1-PB4 may determine memory cells having a threshold voltage greater than or less than fourth read voltage VRD4 without actually applying the fourth read voltage VRD4 to the selected wordline SEL WL.

Thereafter, the row decoder may increase the voltage input to the selected wordline SEL WL from the second read voltage VRD2 to the third read voltage VRD3. While the third read voltage VRD3 is applied to the selected wordline SEL WL, the second and fourth page buffers may execute a sensing operation at the third time point T3.

The second page buffers PB2 may execute a sensing operation on second selected memory cells connected to the second bitlines in response to the second sensing signal SEN2, and the fourth page buffers may execute a sensing operation on fourth selected memory cells connected to fourth bitlines in response to a fourth sensing signal SEN4. The second and fourth selected memory cells may commonly receive a third read voltage VRD3 through the selected wordline SEL WL.

The second bitline select signal BLSLT2 of the first select level VSL1 may be input to the select circuit of each of the second page buffers, and the fourth bitline select signal BLSLT4 of the second select level VSL2 may be input to the select circuit of each of the fourth page buffers PB4. By setting the second bitline select signal BLSLT2 and the fourth bitline select signal BLSLT4 to have different levels, the second bitlines may be controlled to have different bias states from the fourth bitlines. For example, more current may flow in the fourth bitlines than in the second bitlines.

Accordingly, the same effect of inputting a higher voltage to the fourth selected memory cells than the voltage input to the second selected memory cells may be obtained.

The same effect of inputting the third read voltage VRD3 to the second selected memory cells and inputting a voltage greater than the third read voltage VRD3, for example, a fifth read voltage VRD5, to the fourth selected memory cells may be obtained. Accordingly, while the third read voltage VRD3 is input to the selected wordline SEL WL, the second page buffers may determine memory cells having a threshold voltage higher than the third read voltage VRD3 among the second selected memory cells at the third time point T3, and the fourth page buffers may determine memory cells having a threshold voltage smaller than the fifth read voltage VRD5.

As described above, in various example embodiments, the first to third read voltages VRD1-VRD3 may be input to the selected wordline SEL WL in sequence and may determine memory cells having a threshold voltage greater or less than the first or third read voltages VRD1-VRD3. Alternatively or additionally, by setting a portion of the bitline select signals BLSLT1-BLSLT4 to different levels and controlling a portion of the bitlines to different bias states, memory cells having a threshold voltage larger or smaller than the fourth and fifth read voltages VRD4 and VRD5 which may not be actually input to the selected wordline SEL WL may also be determined.

The first page buffers may determine memory cells having a threshold voltage higher than the first read voltage VRD1 at the first time point T1, and may determine memory cells having a threshold voltage smaller than the second read voltage VRD2 at the second time point T2, such that first cell count data, which is the number of memory cells having a threshold voltage between the first read voltage VRD1 and the second read voltage VRD2, may be generated. The second page buffers may determine memory cells having a threshold voltage higher than the second read voltage VRD1 at the second time point T2, and memory cells having a threshold voltage smaller than the third read voltage VRD3 may be determined at the third time point T3, such that second cell count data, which is the number of memory cells having a threshold voltage between the second read voltage VRD2 and the third read voltage VRD3, may be generated.

The third page buffers may determine memory cells having a threshold voltage higher than the third read voltage VRD3 at the first time point T1, and memory cells with a threshold voltage smaller than the fourth read voltage VRD4 may be determined at the second time point T2, such that third cell count data, which is the number of memory cells having a threshold voltage between the third read voltage VRD3 and the fourth read voltage VRD4, may be generated. The fourth page buffers may determine memory cells having a threshold voltage higher than the fourth read voltage VRD4 at the second time point T2, and memory cells with a threshold voltage lower than the fifth read voltage VRD5 may be determined at the third time point T3, such that fourth cell count data, which is the number of memory cells having a threshold voltage between the fourth read voltage VRD4 and the fifth read voltage VRD5, may be generated.

FIGS. 12 to 17 are diagrams illustrating operations of a memory device according to various example embodiments.

In various example embodiments described with reference to FIGS. 12 to 17, while a valley search operation is executed, the memory device may group bitlines into the first to fourth bitlines, and may input the first to third read voltages VRD1-VRD3 to the selected wordline SEL WL in sequence.

Figure 12:
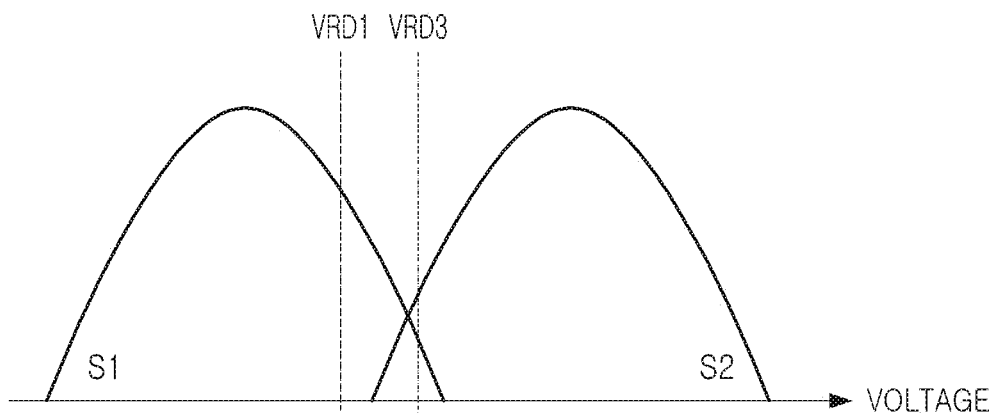
FIGS. 12 to 17 are diagrams illustrating operations of a memory device according to various example embodiments.
Figure 13:
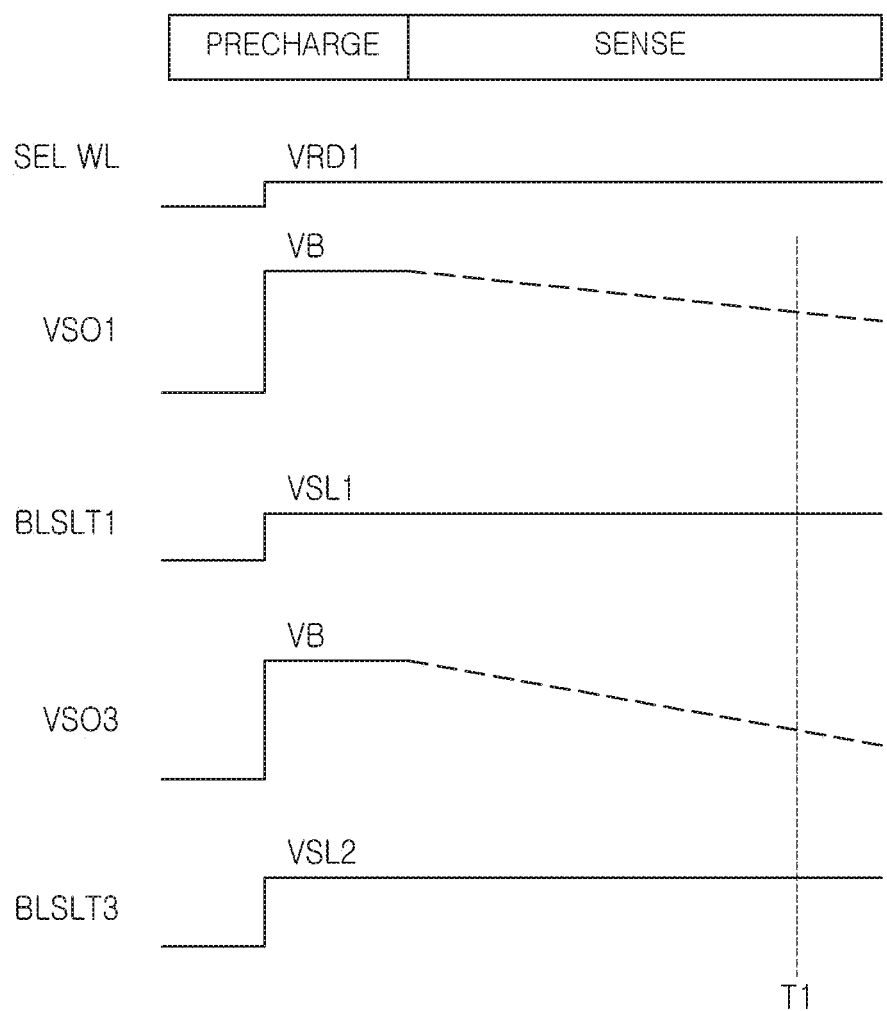

FIGS. 12 and 13 may be diagrams illustrating operations of page buffers while a first read voltage VRD1 is input to a selected wordline SEL WL. Referring to FIGS. 12 and 13, in the precharge period, the first sensing node voltage VSO1 of the first page buffers connected to the first bitlines and the third sensing node voltage VSO3 of the third page buffers connected to the third bitlines may increase to the same bias voltage VB. The first bitline select signal BLSLT1 input to the select circuit of the first page buffers may be set to the first select level VSL1, and the third bitline select signal BLSLT3 input to the select circuit of the third page buffers may be set to a second select level VSL2 greater than the first select level VSL1.

Due to a level difference between the first bitline select signal BLSLT1 and the third bitline select signal BLSLT3, more current may flow in the third bitlines than in the first bitlines. In other words, the current that the third page buffers input to the third bitlines may be greater than the current that the first page buffers input to the first bitlines.

The third sensing node voltage VSO3 may decrease more swiftly by the develop operation starting after the precharge period, and the same effect in which the first read voltage VRD1 may be input to selected memory cells connected to the first bitlines, and a third read voltage VRD3 greater than the first read voltage VRD1 may be input to selected memory cells connected to the third bitlines may be obtained. Accordingly, at the first time point T1, the first page buffers may determine selected memory cells with a threshold voltage greater than the first read voltage VRD1, and the third page buffers may determine selected memory cells having a threshold voltage higher than the third read voltage VRD3.

Figure 14:
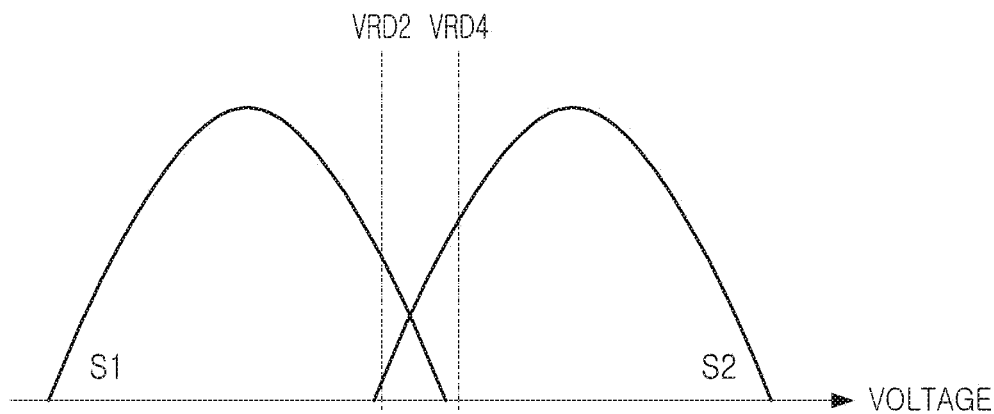
Figure 15:
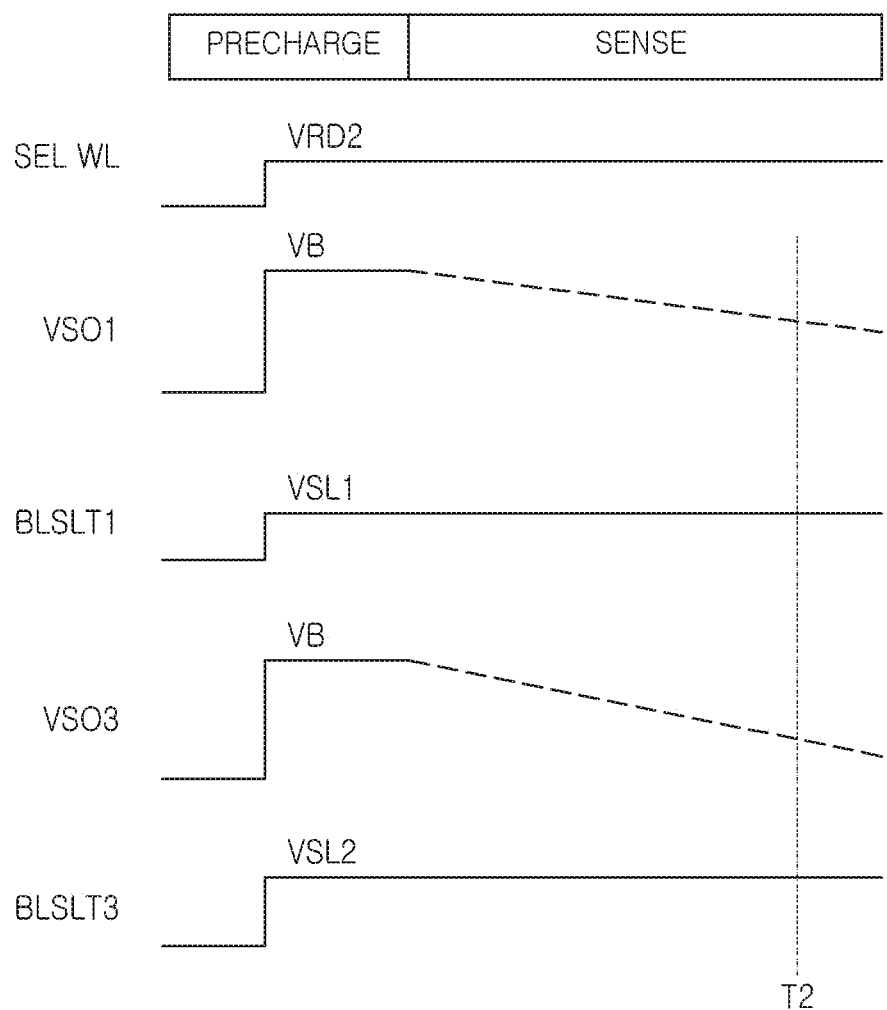

FIGS. 14 and 15 may be diagrams illustrating the operation of page buffers while a second read voltage VRD2 is input to a selected wordline SEL WL. Referring to FIGS. 14 and 15, in the precharge period, the first to fourth sensing node voltages VSO1-VSO4 of the first to fourth page buffers may increase to the same level as a level of the bias voltage VB. Meanwhile, the first and second bitline select signals BLSLT1 and BLSLT2 input to the select circuit of the first and second page buffers may be set to the first select level VSL1, and the third and fourth bitline select signals BLSLT3 and BLSLT4 input to the select circuit of the third and fourth page buffers may be set to a second select level VSL2 greater than the first select level VSL1.

Due to the difference between the first select level VSL1 and the second select level VSL2, more current may flow in the third and fourth bitlines than in the first and second bitlines. For example, the current input to the fourth bitlines by the fourth page buffers may be greater than the current input to the second bitlines by the second page buffers.

In a develop operation starting after a precharge period, third and fourth sensing node voltages VSO3 and VSO4 may decrease more swiftly than first and second sensing node voltages VSO1 and VSO2. Accordingly, the effect in which the second read voltage VRD2 may be input to selected memory cells connected to the first bitlines and the second bitlines, and the fourth read voltage VRD4 greater than the second read voltage VRD2 may be input to the selected memory cells connected to the third bitlines and fourth bitlines may be obtained.

At the second time point T2, the first page buffers may determine selected memory cells having a threshold voltage lower than the second read voltage VRD2, and the second page buffers may determine selected memory cells having a threshold voltage higher than the second read voltage VRD2. Meanwhile, the third page buffers may determine selected memory cells having a lower threshold voltage than the fourth read voltage VRD4, and the fourth page buffers may determine selected memory cells having a higher threshold voltage than the fourth read voltage VRD4.

Figure 16:
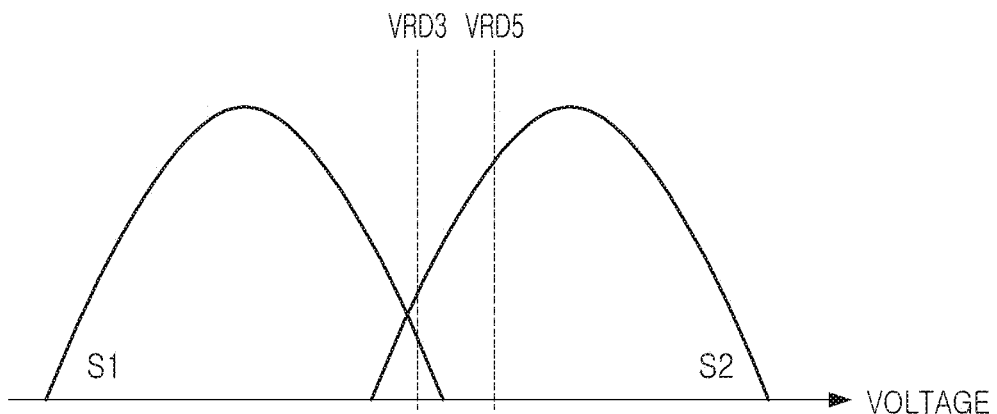
Figure 17:
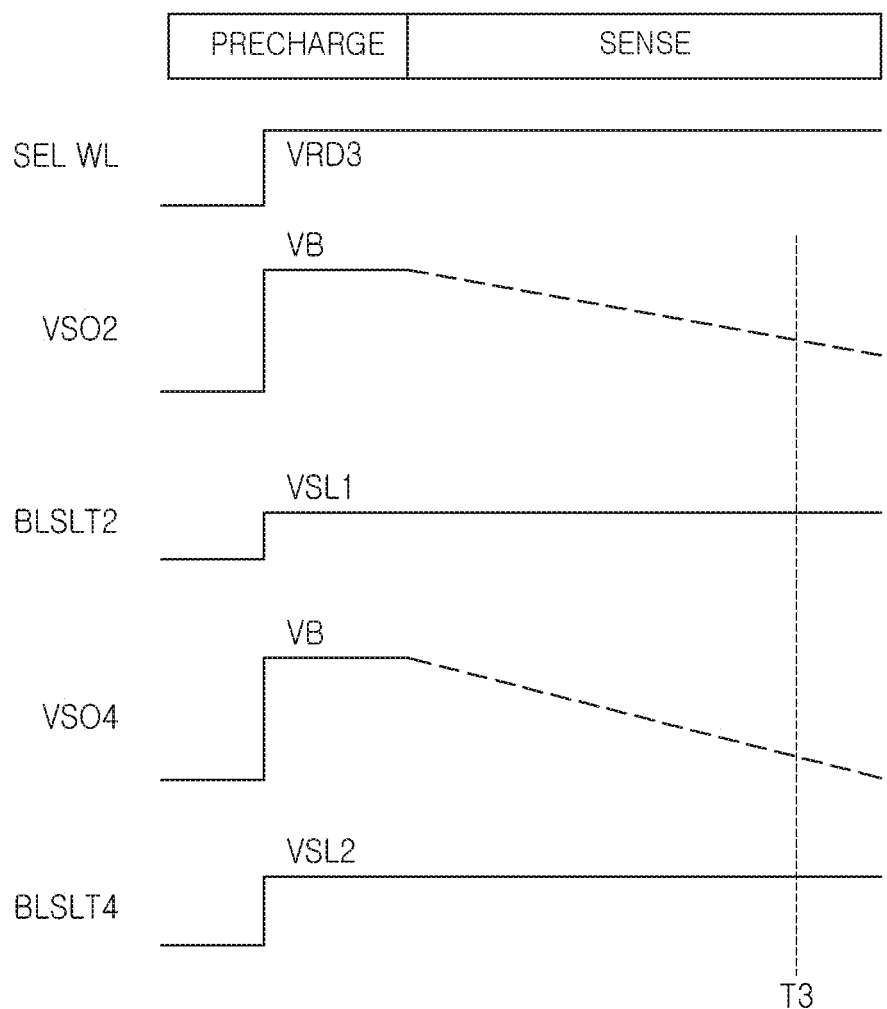

FIGS. 16 and 17 may be diagrams illustrating the operation of page buffers while a third read voltage VRD3 is input to a selected wordline SEL WL. Referring to FIGS. 16 and 17, in the precharge period, the second sensing node voltage VSO2 of the second page buffers connected to the second bitlines and the fourth sensing node voltage VSO4 of the fourth page buffers connected to the fourth bitlines may be increased to at the same bias voltage VB. Meanwhile, the second bitline select signal BLSLT2 may be set to a first select level VSL1, and the fourth bitline select signal BLSLT4 may be set to a second select level VSL2 greater than the first select level VSL1.

Due to a level difference between the second bitline select signal BLSLT2 and the fourth bitline select signal BLSLT4, more current may flow in the fourth bitlines than in the second bitlines. In the develop operation after the precharge period, the fourth sensing node voltage VSO4 may decrease more rapidly, and the effect in which the third read voltage VRD3 is input to selected memory cells connected to the second bitlines, and the fifth read voltage VRD5 greater than third read voltage VRD3 is input to selected memory cells connected to the fourth bitlines may be obtained. Accordingly, at the third time point T3, the second page buffers may determine selected memory cells with a threshold voltage lower than the third read voltage VRD3, and the fourth page buffers may determine selected memory cells with a threshold voltage lower than the fifth read voltage VRD5.

Figure 18:
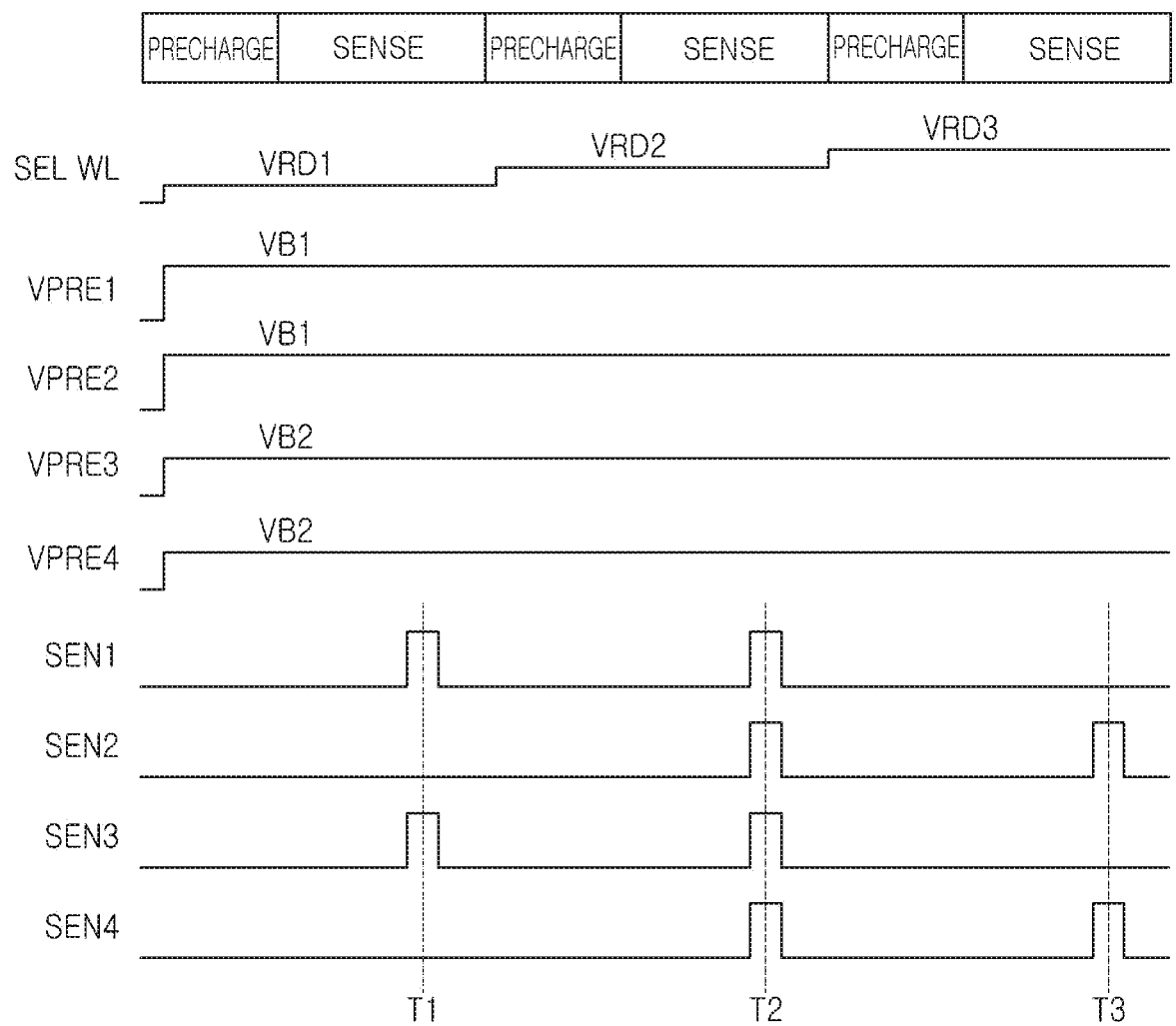
FIGS. 18 to 20 are diagrams illustrating operations of a memory device according to various example embodiments.
Figure 19:
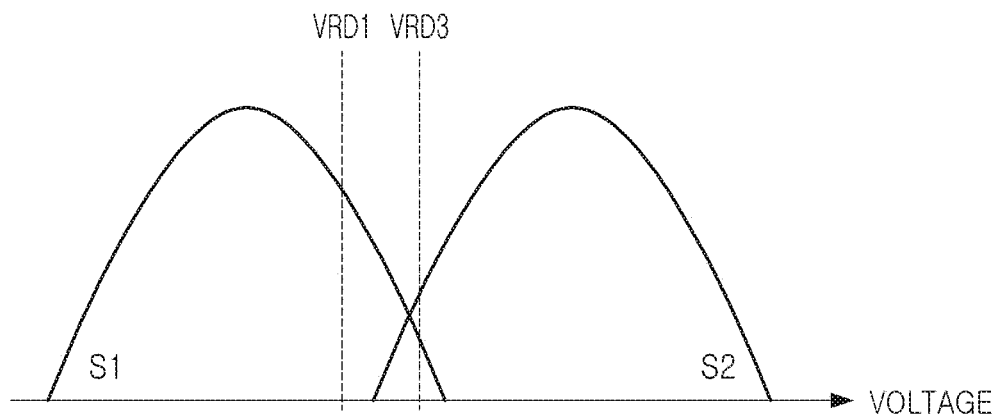
Figure 20:
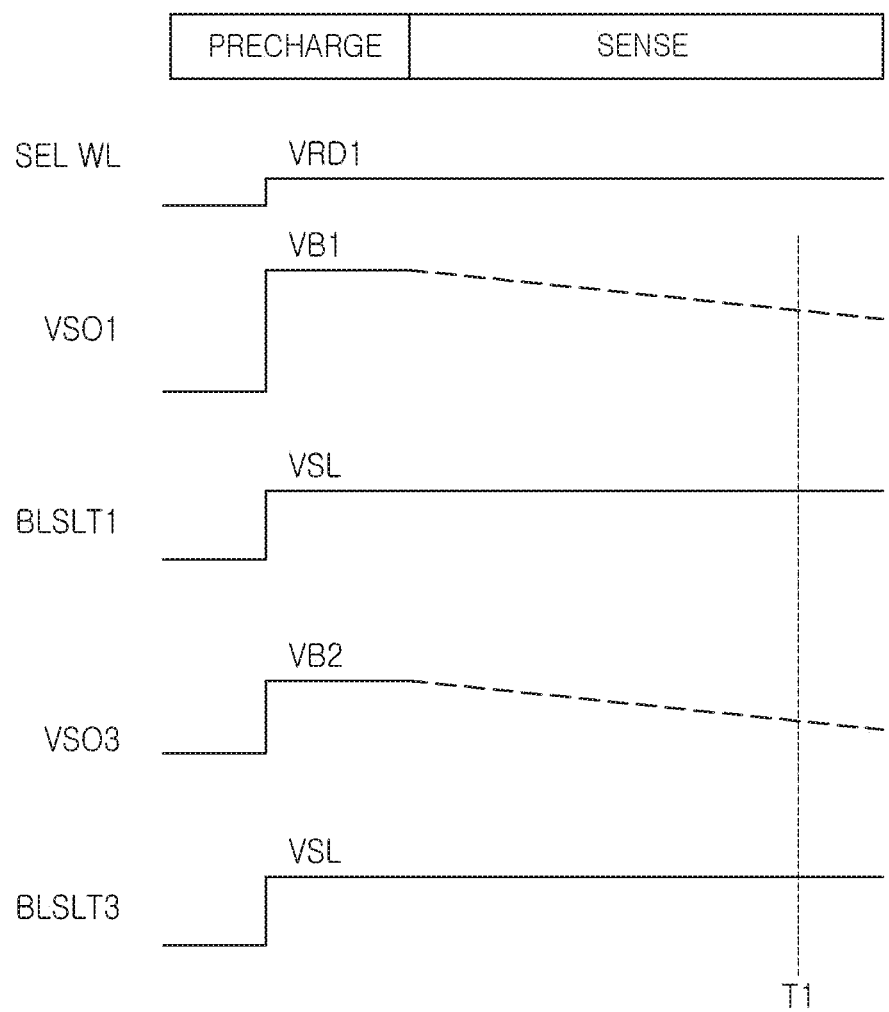

FIGS. 18 to 20 are diagrams illustrating operations of a memory device according to various example embodiments.

First, referring to FIG. 18, first to third read voltages VRD1-VRD3 may be input to a selected wordline SEL WL by a row decoder. Also, the control logic of the memory device may divide bitlines into four groups and may define bitlines as first bitlines, second bitlines, third bitlines and fourth bitlines. Similarly to bitlines, a plurality of page buffers may also be divided into first page buffers, second page buffers, third page buffers and fourth page buffers. A sensing time point at which each of the first to fourth page buffers may execute a sensing operation may be determined by the first to fourth sensing signals SEN1 to SEN4.

In various example embodiments described with reference to FIG. 18, the first precharge voltage VPRE1 and the second precharge voltage VPRE2 supplied to each sensing node of the first page buffers and the second page buffers may be set to the first bias voltage VB1. The third precharge voltage VPRE3 and the fourth precharge voltage VPRE4 supplied to the sensing nodes of the third page buffers and the fourth page buffers may be set to a second bias voltage VB2 smaller than the first bias voltage VB1. In various example embodiments illustrated in FIG. 18, bitline select signals input to select circuits of each of a plurality of page buffers may have the same level.

While the first read voltage VRD1 is input to the selected wordline SEL WL, first page buffers and third page buffers may execute a sensing operation at a first time point T1. Since the bitline select signal of the same level is input to each of the first and third page buffers PB1 and PB3, the sensing node voltage of each of the first and third page buffers may decrease with the same slope in a develop operation.

However, since the sensing node voltage of the first page buffers is precharged to a level than higher a level of the sensing node voltage of the third page buffers, the level of voltage sensed by each of the first page buffers at the first time point T1 may be higher than the level of the voltage to be sensed. Accordingly, the same sensing result as when the voltage input to the first selected memory cells connected to the first page buffers is smaller than the voltage input to the third selected memory cells connected to the third page buffers may be obtained. Hereinafter, the example embodiment will be described in greater detail with reference to FIGS. 19 and 20.

Referring to FIGS. 19 and 20, in the precharge period, the first sensing node voltage VSO1 of the first page buffers may be precharged with a first bias voltage VB1, and the third sensing node voltage VSO3 of the third page buffers may be precharged with a second bias voltage VB2 smaller than the first bias voltage VB1. Meanwhile, the first bitline select signal BLSLT1 input to the select circuit of the first page buffers and the third bitline select signal BLSLT3 input to the select circuit of the third page buffers may have a predetermined select level VSL. As an example, a difference between the first bias voltage VB1 and the second bias voltage VB2 may be higher than the level difference between the read voltages VRD1-VRD3, for example, the level difference between the first read voltage VRD1 and the second read voltage VRD2. For example, each of the first bias voltage VB1 and the second bias voltage VB2 may be determined depending on the voltage of bitlines BL and turning on/off characteristics of the selected memory cells according to the voltage of sensing nodes connected to bitlines BL and included in page buffers (PB).

Since the first bitline select signal BLSLT1 and the third bitline select signal BLSLT3 have the same level, due to the develop operation starting after the precharge period, the first sensing node voltage VSO1 and the third sensing node voltage VSO3 may decrease with the same slope. However, since the first sensing node voltage VSO1 and the third sensing node voltage VSO3 are precharged on different levels, the first sensing node voltage VSO1 may have a level higher than a level of the third sensing node voltage VSO3 at the first time point T1. Accordingly, the first read voltage VRD1 may be input to selected memory cells connected to the first page buffers through the first bitlines, and the same sensing result as a third read voltage VRD3 greater than the first read voltage VRD1 may be input to selected memory cells connected to third page buffers through third bitlines. At the first time point T1, the first page buffers may determine selected memory cells with a threshold voltage greater than the first read voltage VRD1, and the third page buffers may determine selected memory cells with a threshold voltage greater than the third read voltage VRD3.

Referring again to FIG. 18, while the second read voltage VRD1 is input to the selected wordline SEL WL, the first to fourth page buffers may execute a sensing operation at the second time point T2. Since the bitline select signal of the same level is input to each of the first to fourth page buffers, the sensing node voltage of each of the first to fourth page buffers may decrease with the same slope in a develop operation.

However, since the sensing node voltage of the first and second page buffers is precharged to a level than higher a level of the sensing node voltage of the third and fourth page buffers, at the second time point T2, a voltage level sensed by each of the first and second page buffers may be higher than a voltage level sensed by each of the third and fourth page buffers. Accordingly, the same sensing result as when the voltage input to selected memory cells connected to the first and second page buffers is smaller than the voltage input to selected memory cells connected to the third and fourth page buffers may be obtained.

At the second time point T2, the first page buffers may determine memory cells having a threshold voltage lower than the second read voltage VRD2, and the second page buffers may determine memory cells having a threshold voltage higher than the second read voltage VRD2. The third page buffers may determine memory cells having a threshold voltage lower than the fourth read voltage VRD4, and the fourth page buffers may determine memory cells having a threshold voltage greater than the fourth read voltage VRD4.

Thereafter, while a third read voltage VRD1 is input to the selected wordline SEL WL, second and fourth page buffers may execute a sensing operation at a third time point T3. The sensing node voltage of the second page buffers may be precharged to a level than higher a level of the sensing node voltage of the fourth page buffers, and at the third time point T3, the level of the voltage sensed by each of the second page buffers may be higher than the level of the voltage sensed by each of the fourth page buffers. Accordingly, the second page buffers may determine memory cells having a threshold voltage lower than the third read voltage VRD3, and the fourth page buffers may determine memory cells having a threshold voltage lower than the fifth read voltage VRD5.

FIGS. 21A to 21D are diagrams illustrating operations of a memory device according to various example embodiments.

Figure 21A:
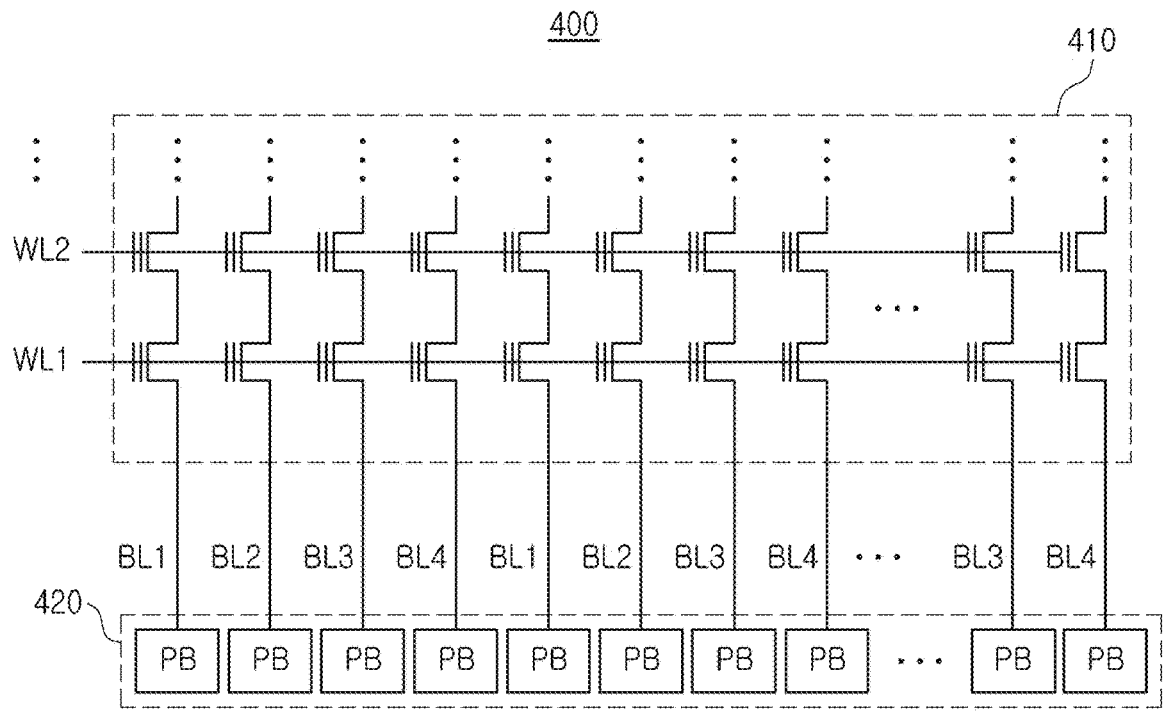
FIGS. 21A to 21D are diagrams illustrating operations of a memory device according to various example embodiments.

Referring first to FIG. 21A, a memory device 400 according to various example embodiments may include a memory cell array 410, and a page buffer circuit 420. The memory cell array 410 may include a plurality of memory cell strings, and memory cells included in each of the plurality of memory cell strings may be connected to wordlines WL1-WL2. A plurality of memory cell strings may be connected to a plurality of page buffers PB included in the page buffer circuit 420 through a plurality of bitlines.

When the memory device 400 fails to correct an error of the read data obtained through the read operation, the memory device 400 may execute a valley search operation to determine an optimal read voltage having a different level from a level of the read voltage input to the selected wordline in the read operation. In the valley search operation, the memory device 400 may divide a plurality of bitlines into a plurality of groups. For example, the number of cell count data obtainable in a valley search operation may vary depending on the number of groups for dividing a plurality of bitlines, and the number of read voltages input to a selected wordline.

Referring to FIG. 21A, a plurality of bitlines may be divided into four groups. In various example embodiments illustrated in FIG. 21A, the first bitline BL1 included in the first group, the second bitline BL2 included in the second group, the third bitline BL3 included in the third group, and the fourth bitline BL4 included in the fourth group may be disposed in order. In other words, the four bitlines disposed in order may be defined as first to fourth bitlines BL1-BL4, and each of the (4$i$-3)th (i is a natural number) bitline may be defined as the first bitline BL1, each of (4$i$-2)th bitlines may be defined as a second bitline BL2, each of the (4$i$-1)th bitlines may be defined as a third bitline BL3, and each of the (4$i$)th bitlines may be defined as a fourth bitline BL4.

Figure 21B:
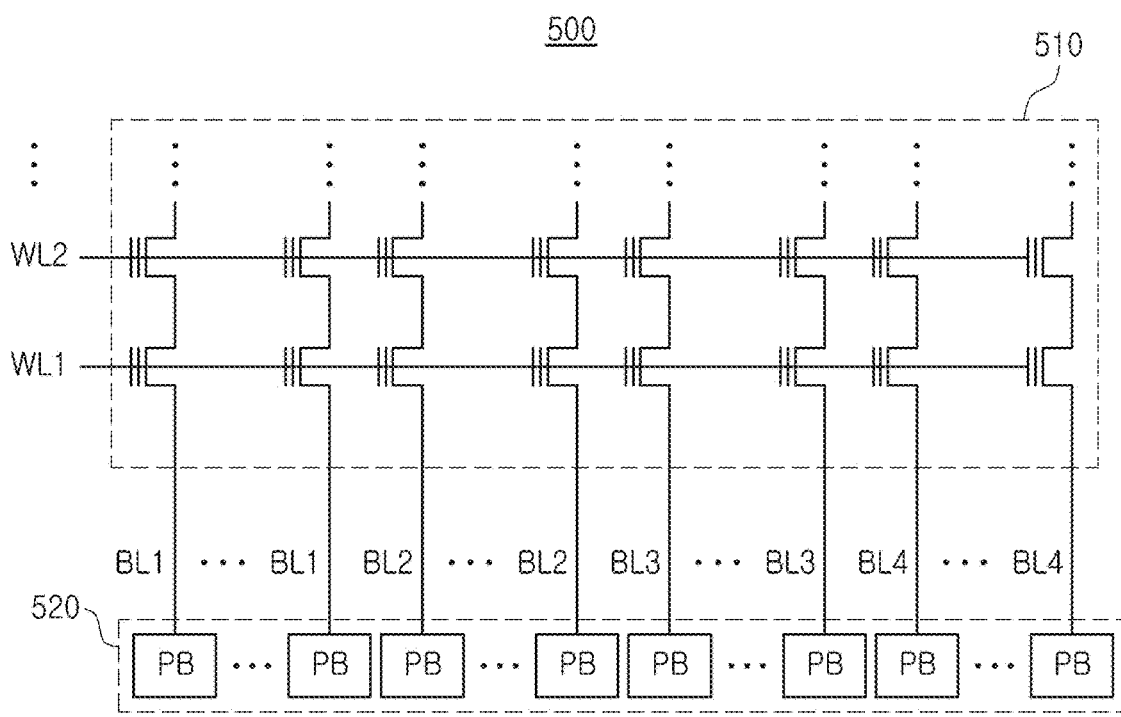

Thereafter, referring to FIG. 21B, a memory device 500 according to various example embodiments may include a memory cell array 510 and a page buffer circuit 520. The memory cell array 510 may include a plurality of memory cell strings, and the plurality of memory cell strings may be connected to wordlines WL1 and WL2 and a plurality of bitlines. A plurality of page buffers PB included in the page buffer circuit 520 may be connected to the plurality of memory cell strings through the plurality of bitlines.

In various example embodiments illustrated in FIG. 21B, a plurality of bitlines may be divided into four groups, and bitlines of a portion adjacent to each other may be divided into one group. Referring to FIG. 21B, the first bitlines BL1 may be adjacent to each other, the second bitlines BL2 may be adjacent to each other, the third bitlines BL3 may be adjacent to each other, and the fourth bitlines BL4 may be adjacent to each other.

Figure 21C:
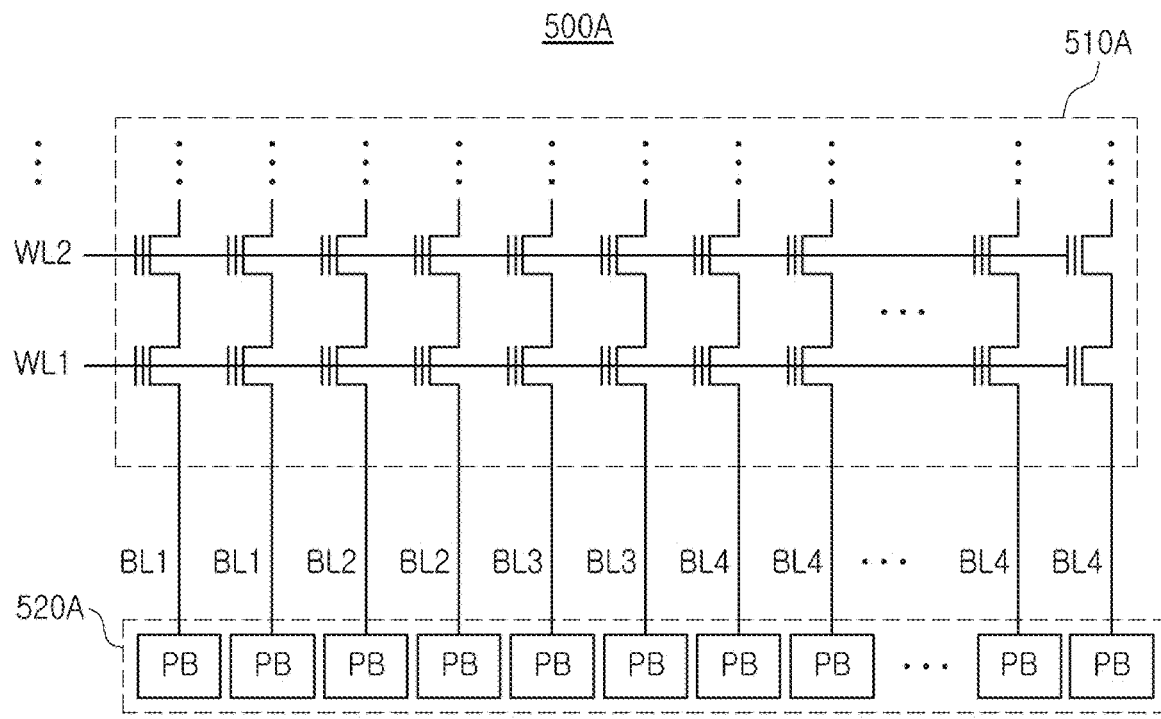

Thereafter, referring to FIG. 21C, a memory device 500A according to various example embodiments may include a memory cell array 510A and a page buffer circuit 520A. The memory cell array 510A may include a plurality of memory cell strings, and the plurality of memory cell strings may be connected to the wordlines WL1 and WL2 and the plurality of bitlines. The plurality of page buffers PB included in the page buffer circuit 520A may be connected to a plurality of memory cell strings through the plurality of bitlines.

In various example embodiments illustrated in FIG. 21C, a pair of bitlines adjacent to each other may be classified as one group. Referring to FIG. 21C, eight bitlines disposed consecutively may include two first bitlines BL1, two second bitlines BL2, two third bitlines BL3, and two fourth bitlines BLA in sequence.

Figure 21D:
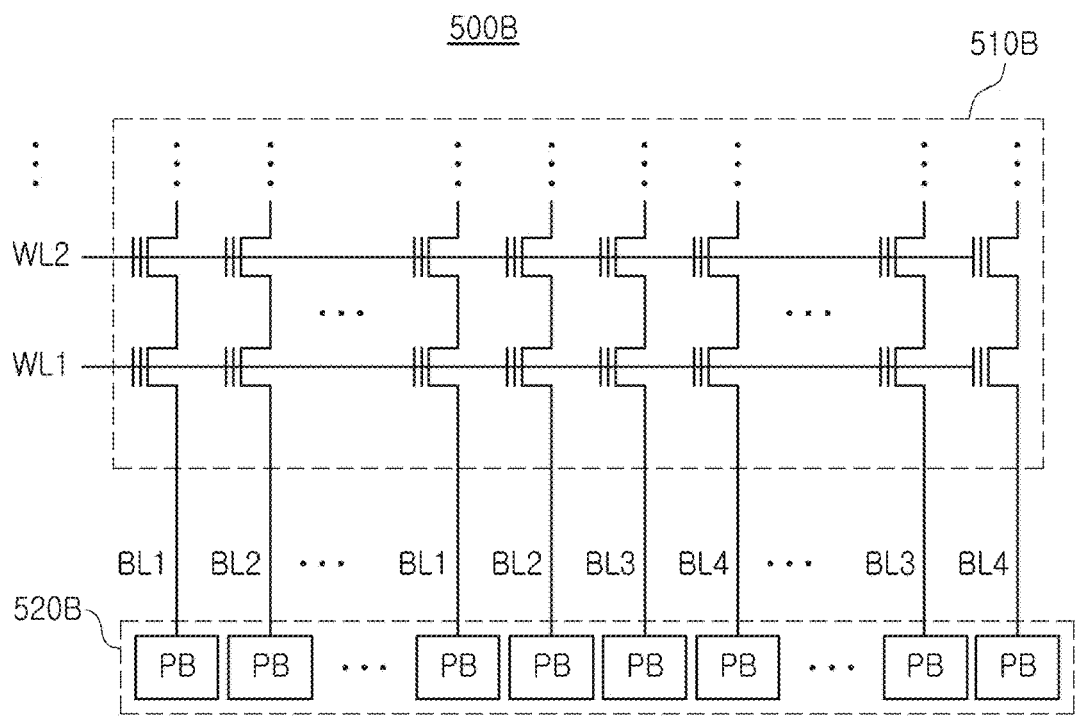

In various example embodiments illustrated in FIG. 21D, a plurality of bitlines connected to the plurality of memory cell strings disposed in a memory cell array 510B of a memory device 500B may be divided into first to fourth bitlines BL1-BL4. Referring to FIG. 21D, the first bitline BL1 and the second bitline BL2 may be alternately disposed first, and the third bitline BL3 and the fourth bitline BLA may also be alternately disposed.

As described above, in various example embodiments, a plurality of bitlines may be grouped in various manners in a valley search operation. As described above, the number of pieces of cell count data generated in the valley search operation may vary depending on the number of groups for classifying a plurality of bitlines. Hereinafter, the example embodiment will be described in greater detail with reference to FIGS. 22 to 25.

FIGS. 22 to 25 are diagrams illustrating operations of a memory device according to various example embodiments.

Figure 22:
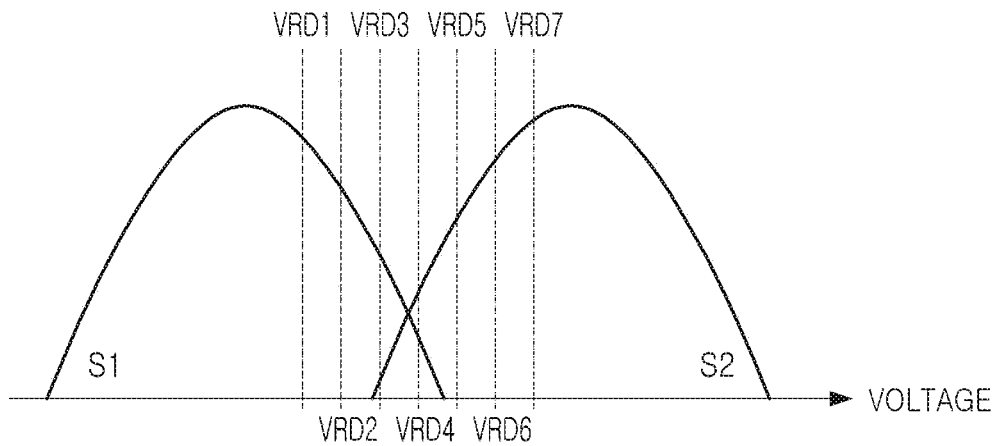
FIGS. 22 to 25 are diagrams illustrating operations of a memory device according to various example embodiments.

First, in various example embodiments described with reference to FIGS. 22 and 23, a memory device may divide a plurality of bitlines into six groups in a valley search operation. In this case, as illustrated in FIG. 22, six pieces of cell count data having threshold voltages between the first to seventh read voltages VRD1-VRD7 having different levels may be obtained.

Figure 23:
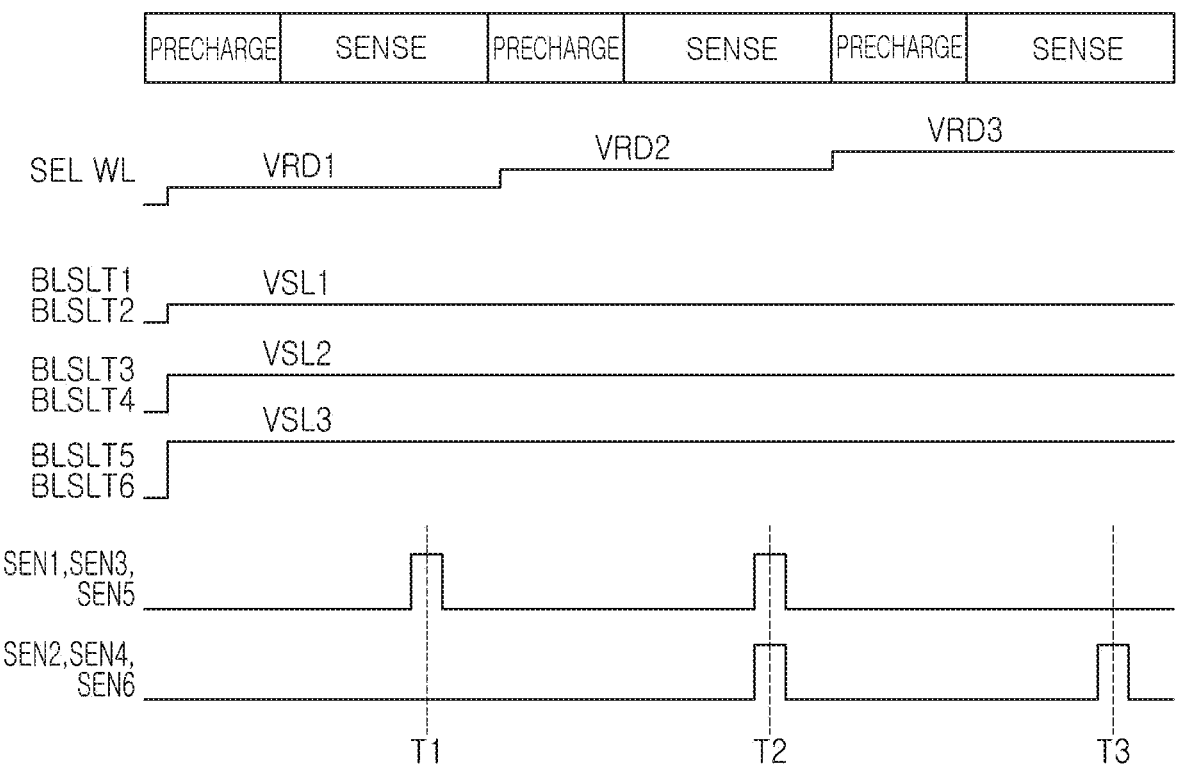

Referring to FIG. 23, first to third read voltages VRD1-VRD3 may be input to the selected wordline SEL WL in order. While the valley search operation is executed, the fourth to seventh read voltages VRD4-VRD7 may not actually be input to the selected wordline SEL WL. Instead, by setting the bias state of a portion of the six groups of plural bitlines differently, an operation in which fourth to seventh read voltages VRD4-VRD7 are input to a portion of selected memory cells connected to the selected wordline SEL WL may be implemented.

In various example embodiments illustrated in FIG. 23, a first bitline select signal BLSLT1 of a first select level VSL1 may be input to the first page buffers to which first bitlines of the first group are connected. Similarly, a second bitline select signal BLSLT2 input to second page buffers connected to second bitlines of the second group may also have a first select level VSL1. The third bitline select signal BLSLT3 input to the third page buffers connected to the third bitlines and the fourth bitline select signal BLSLT4 input to the fourth page buffers connected to the fourth bitlines may have a second select level VSL2 higher than the first select level VSL1. The fifth bitline select signal BLSLT5 input to the fifth page buffers connected to the fifth bitlines and the sixth bitline select signal BLSLT6 input to the sixth page buffers connected to the sixth bitlines may have a third select level VSL3 higher than the second select level VSL2.

Accordingly, even when the voltage of the selected wordline SEL WL has a constant level, the magnitudes of currents flowing through at least a portion of the first to sixth bitlines may be different from each other. For example, the smallest current may flow through the first and second bitlines, and the largest current may flow through the fifth and sixth bitlines.

At the first time point T1, the first, third and fifth page buffers may execute a sensing operation in response to the first, third and fifth sensing signals SEN1, SEN3, and SEN5. Since the bias state is determined such that the smallest current may flow in the first bitlines and the largest current may flow in the fifth bitlines, the voltage sensed by the first page buffers may be the highest and the voltage sensed by the fifth page buffers may be the highest. The voltage sensed by the third page buffers may be higher than the voltage sensed by the first page buffers and may be lower than the voltage sensed by the fifth page buffers.

Accordingly, the first page buffers may determine memory cells having a threshold voltage higher than the first read voltage VRD1. Meanwhile, the third page buffers may determine memory cells having a threshold voltage greater than the third read voltage VRD3, and the fifth page buffers may determine memory cells having a threshold voltage greater than the fifth read voltage VRD5.

While the second read voltage VRD2 is applied to the selected wordline SEL WL, the first to sixth page buffers may execute a sensing operation in response to the first to sixth sensing signals SEN1-SEN6. For example, at the second time point T2, the first page buffers may determine memory cells having a threshold voltage lower than the second read voltage VRD2, and the second page buffers may determine memory cells having a threshold voltage higher than the second read voltage VRD2. The third page buffers may determine memory cells having a threshold voltage lower than the fourth read voltage VRD4, and the fourth page buffers may determine memory cells having a threshold voltage greater than the fourth read voltage VRD4. The fifth page buffers may determine memory cells having a threshold voltage lower than the sixth read voltage VRD6, and the sixth page buffers may determine memory cells having a threshold voltage greater than the sixth read voltage VRD6.

While the third read voltage VRD3 is applied to the selected wordline SEL WL, the second, the fourth and sixth page buffers may execute a sensing operation in response to the second, fourth and sixth sensing signals SEN2, SEN4, and SEN6. At the third time point T3, the second page buffers may determine memory cells having a threshold voltage lower than the third read voltage VRD3. The fourth page buffers may determine memory cells having a threshold voltage lower than the fifth read voltage VRD5, and the sixth page buffers may determine memory cells having a threshold voltage greater than the seventh read voltage VRD7. By executing the valley search operation as illustrated in FIGS. 22 and 23, more pieces of cell count data may be obtained while reducing an increase in time required for the valley search operation.

Figure 24:
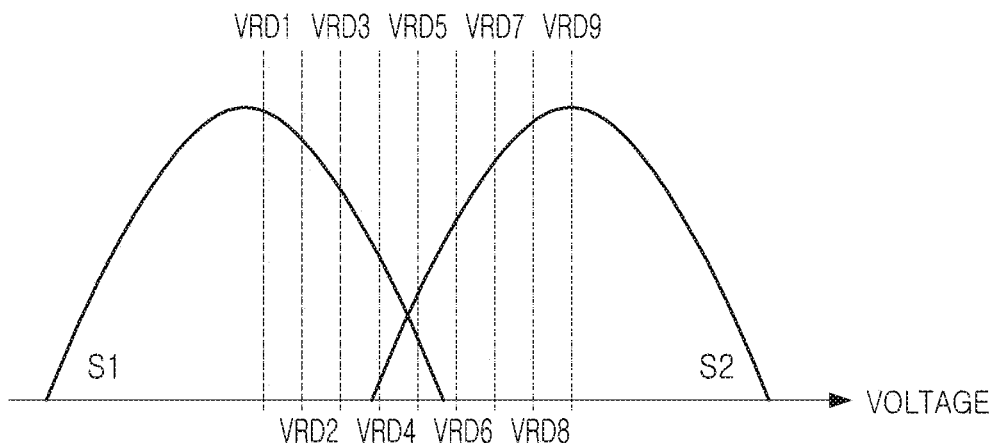

Thereafter, in various example embodiments described with reference to FIGS. 24 and 25, a memory device may divide a plurality of bitlines into eight groups in a valley search operation. In this case, as illustrated in FIG. 24, eight pieces of cell count data having threshold voltages between first to ninth read voltages VRD1-VRD9 having different levels may be obtained.

Figure 25:
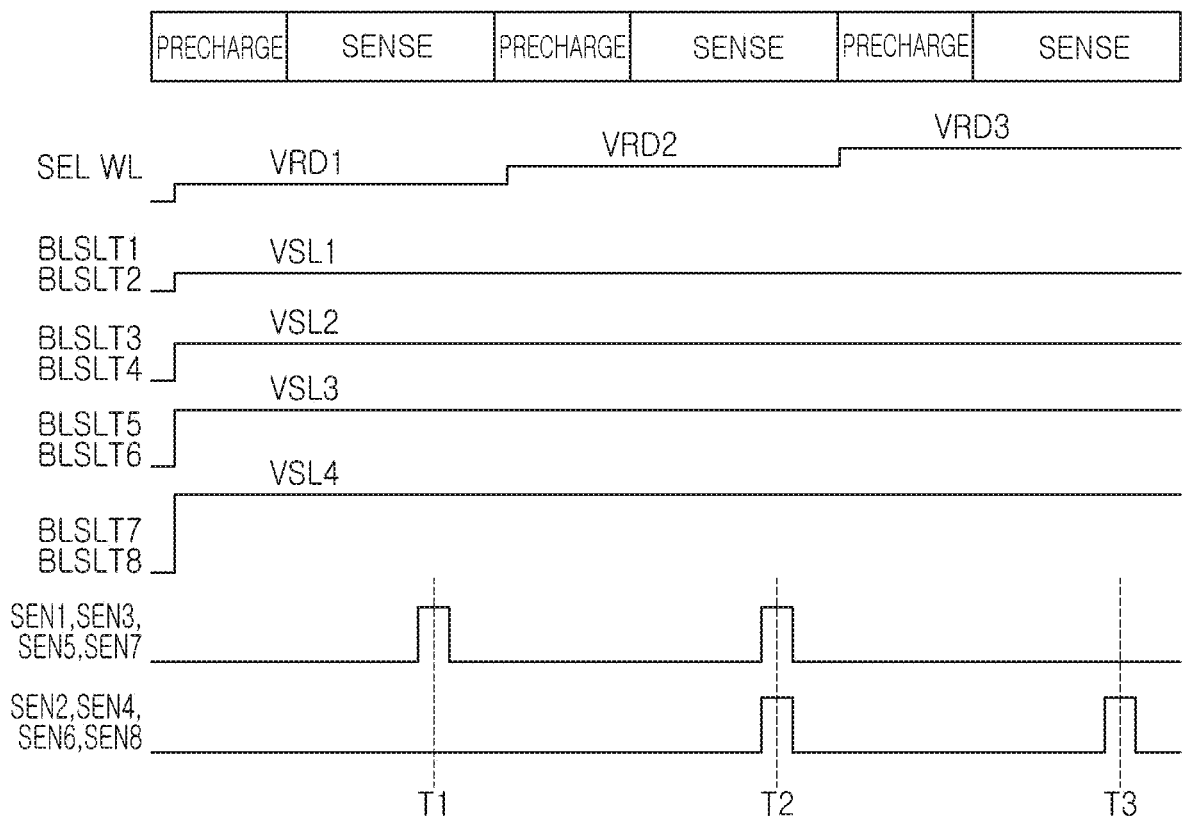
Figure 26:
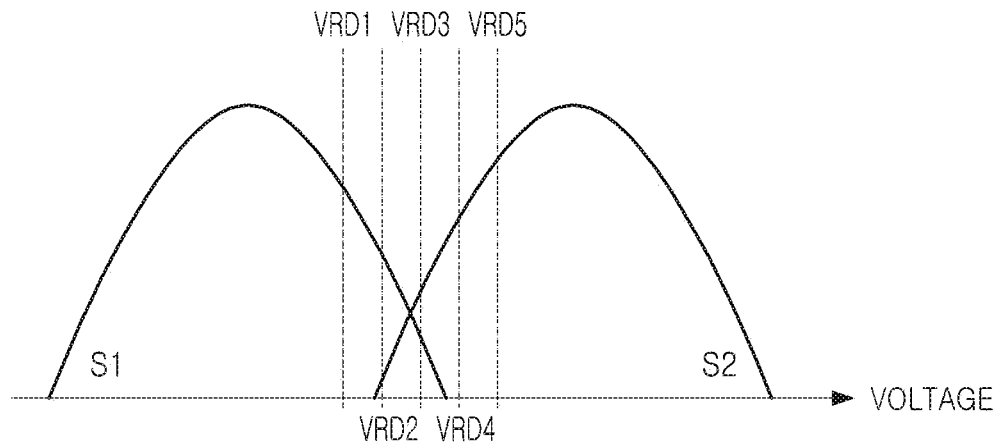
FIGS. 26 to 29 are diagrams illustrating operations of a memory device according to various example embodiments.

Referring to FIG. 25, the first to third read voltages VRD1-VRD3 may be input to the selected wordline SEL WL in sequence. While the valley search operation is executed, the fourth to ninth read voltages VRD4-VRD9 may not actually be input to the selected wordline SEL WL. Instead, by setting the bias state of a portion of the eight groups of the plurality of bitlines differently, the operation in which the fourth to ninth read voltages VRD4-VRD9 are input to a portion of selected memory cells connected to the selected wordline SEL WL may be implemented.

In various example embodiments illustrated in FIG. 25, the first and second bitline select signals BLSLT1 and BLSLT2 input to first page buffers and second page buffers may have a first select level VSL1, and the third and fourth bitline select signals BLSLT3 and BLSLT4 input to the third page buffers and the fourth page buffers may have a second select level VSL2 higher than the first select level VSL1. The fifth and sixth bitline select signals BLSLT5 and BLSLT6 input to the fifth page buffers and sixth page buffers may have a third select level VSL3 higher than the second select level VSL2, and the seventh and eighth bitline select signals BLSLT7 and BLSLT8 input to the seventh page buffers and the eighth page buffers may have a fourth select level VSL4 higher than the third select level VSL3.

Accordingly, even when the voltage of the selected wordline SEL WL has a constant level, the magnitude of a current flowing through at least a portion of the first to eighth bitlines in a develop operation may be different. For example, the smallest current may flow in the first and second bitlines, and the most current may flow in the seventh and eighth bitlines.

At the first time point T1, the first, third, fifth and seventh page buffers may execute a sensing operation in response to the first, third, fifth and seventh sensing signals SEN1, SEN3, SEN5, and SEN7. The smallest current may flow in the first bitlines and the largest current may flow in the seventh bitlines, and accordingly, the voltage sensed by the first page buffers may be the highest and the voltage sensed by the seventh page buffers may be the highest. The voltage sensed by the third page buffers may be higher than the voltage sensed by the first page buffers and may be lower than the voltage sensed by the fifth page buffers.

Accordingly, at the first time point T1, the first page buffers may determine memory cells having a threshold voltage greater than the first read voltage VRD1, and third page buffers may determine memory cells having a threshold voltage greater than the third read voltage VRD3. The fifth page buffers may determine memory cells having a threshold voltage higher than the fifth read voltage VRD5, and the seventh page buffers may determine memory cells having a threshold voltage higher than the seventh read voltage VRD7.

While the second read voltage VRD2 is applied to the selected wordline SEL WL, the entirety of the first to eighth page buffers may execute a sensing operation in response to the first to eighth sensing signals SEN1-SEN8. For example, at the second time point T2, the first page buffers may determine memory cells having a threshold voltage lower than the second read voltage VRD2, and the second page buffers may determine memory cells having a threshold voltage higher than the second read voltage VRD2. The third page buffers may determine memory cells having a threshold voltage lower than the fourth read voltage VRD4, and the fourth page buffers may determine memory cells having a threshold voltage higher than the fourth read voltage VRD4. The fifth page buffers may determine memory cells having a threshold voltage lower than the sixth read voltage VRD6, and the sixth page buffers may determine memory cells having a threshold voltage higher than the sixth read voltage VRD6. The seventh page buffers may determine memory cells having a threshold voltage lower than the eighth read voltage VRD8, and the eighth page buffers may determine memory cells having a threshold voltage higher than the eighth read voltage VRD8.

While the third read voltage VRD3 is applied to the selected wordline SEL WL, the second, fourth, sixth and eighth page buffers PB2, PB4, PB6, and PB8 may execute sensing operations in response to the second, fourth, sixth and eighth sensing signals SEN2, SEN4, SEN6, and SEN8. At the third time point T3, the second page buffers may determine memory cells having a threshold voltage lower than the third read voltage VRD3, and the fourth page buffers may determine memory cells having a threshold voltage lower than the fifth read voltage VRD5. The sixth page buffers may determine memory cells having a threshold voltage higher than the seventh read voltage VRD7, and the eighth page buffers may determine memory cells having a threshold voltage lower than the ninth read voltage VRD9. As described above, more pieces of cell count data may be obtained without increasing the time required for the valley search operation.

In the example embodiments described with reference to FIGS. 22 to 25, the bias state of bitlines may be controlled by the level of a precharge voltage instead of a bitline select signal input to page buffers. For example, as described above with reference to FIG. 18, bitline select signals input to each of the page buffers may be set to the same level, and the level of the precharge voltage may be set differently, such that the operation in which different voltages may be input to a portion of the selected memory cells connected to the selected wordline may be implemented. Alternatively, the level of the bitline select signal input to a portion of the page buffers and the level of the precharge voltage may be set differently according to the example embodiment.

FIGS. 26 to 29 are diagrams illustrating operations of a memory device according to various example embodiments.

Figure 27:
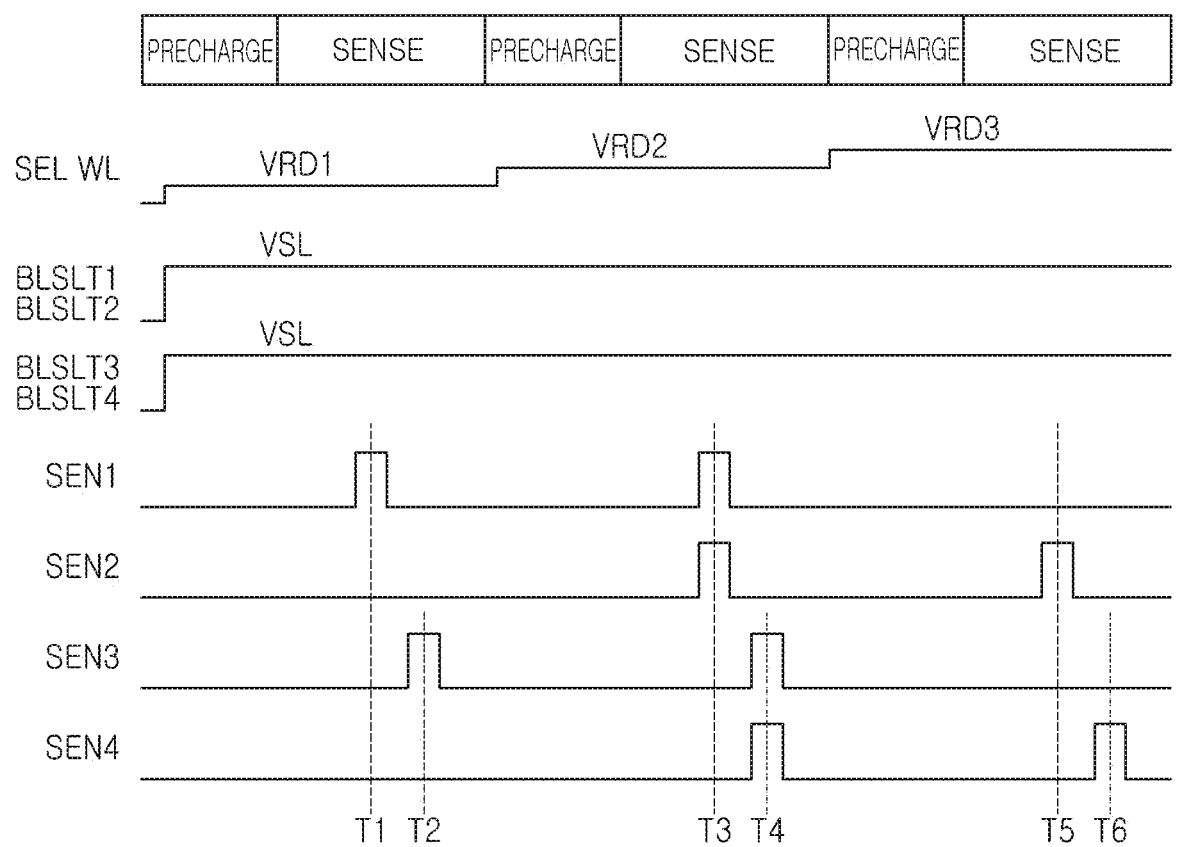

In the example embodiment described with reference to FIGS. 26 to 29, while the first to third read voltages VRD1-VRD3 are input to the selected wordline SEL WL in sequence, pieces of cell count data, which is the number of memory cells having a threshold voltage between first to fifth read voltages VRD1-VRD5, may be obtained. Referring to FIG. 27, the memory device may obtain pieces of cell count data by differently controlling a time point at which a portion of page buffers executes a sensing operation. In other words, in the example embodiments illustrated in FIGS. 26 to 29, a bitline select signal of the same level and a precharge voltage of the same level may be input to the page buffers.

Figure 28:
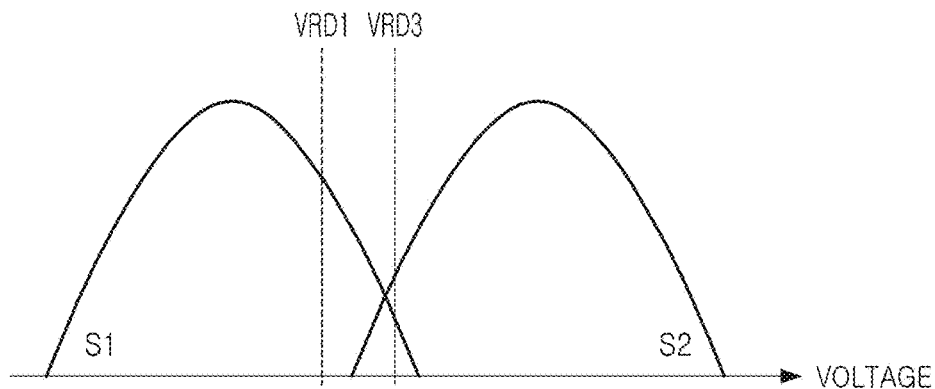
Figure 29:
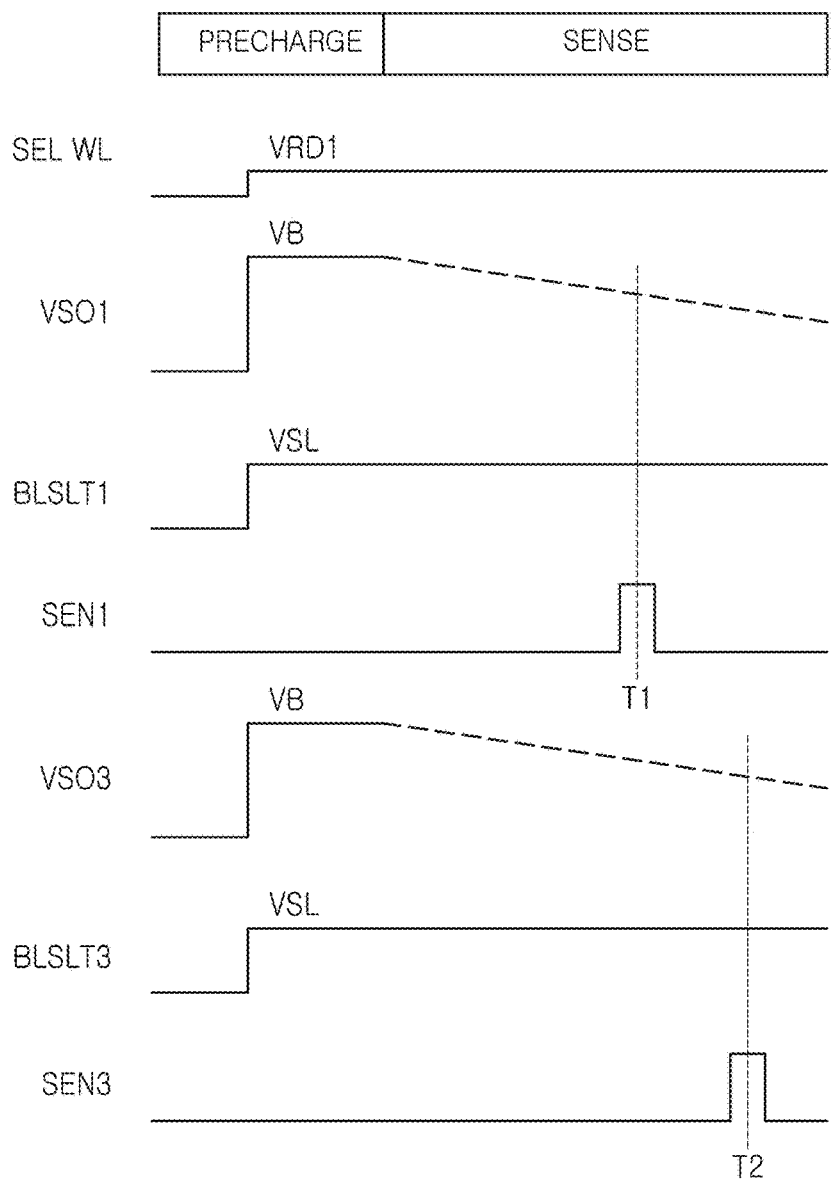

Referring to FIG. 27, while the first read voltage VRD1 is input to the selected wordline SEL WL, the first page buffers may first execute a sensing operation at the first time point T1 in response to the first sensing signal SEN1, and the third page buffers may execute a sensing operation at a second time point T2 later than the first time point T1 in response to the third sensing signal SEN3. Referring to FIGS. 28 and 29, the level of the first sensing node voltage VSO1 sensed by the first page buffers at the first time point T1 may be higher than the level of the third sensing node voltage VSO3 sensed by the third page buffers at the second time point T2.

Accordingly, an operation in which a first read voltage VRD1 is input to selected memory cells connected to first page buffers and a third read voltage VRD3 is input to selected memory cells connected to third page buffers may be implemented. At the first time point T1, the first page buffers may determine memory cells having a threshold voltage higher than the first read voltage VRD1, and at the second time point T2, the third page buffers may determine the threshold voltage higher than the third read voltage VRD3.

While second read voltage VRD2 is input to selected wordline SEL WL, the first page buffers PB1 and the second page buffers PB2 may execute a sensing operation at the third time point T3 in response to the first sensing signal SEN1 and second sensing signal SEN2, and the third page buffers PB3 and fourth page buffers PB4 may execute a sensing operation at a fourth time point T4 later than the third time point T3 in response to the third sensing signal SEN3 and the fourth sensing signal SEN4. The sensing node voltage sensed by the first page buffers and the second page buffers at the third time point T3 may be greater than the sensing node voltage sensed by the third page buffers and the fourth page buffers at the fourth time point T4.

At the third time point T3, the first page buffers may determine memory cells having a threshold voltage lower than the second read voltage VRD2, and the second page buffers may determine memory cells having a threshold voltage higher than the second read voltage VRD2. At the fourth time point T4, the third page buffers may determine memory cells having a threshold voltage lower than the fourth read voltage VRD4, and the fourth page buffers may determine memory cells having a threshold voltage higher than the fourth read voltage VRD4.

While the third read voltage VRD3 is input to the selected wordline SEL WL, the second page buffers execute a sensing operation at the fifth time point T5 in response to the second sensing signal SEN2, and the fourth page buffers may execute a sensing operation at a sixth time point T6 later than a fifth time point T5 in response to a fourth sensing signal SEN4. A sensing node voltage sensed by the second page buffers at the fifth time point T5 may be greater than a sensing node voltage sensed by the fourth page buffers at the sixth time point T6. At the fifth time point T5, the second page buffers may determine memory cells having a threshold voltage lower than the third read voltage VRD3. At the sixth time point T6, the fourth page buffers may determine memory cells of a threshold voltage lower than the fifth read voltage VRD5.

Figure 30:
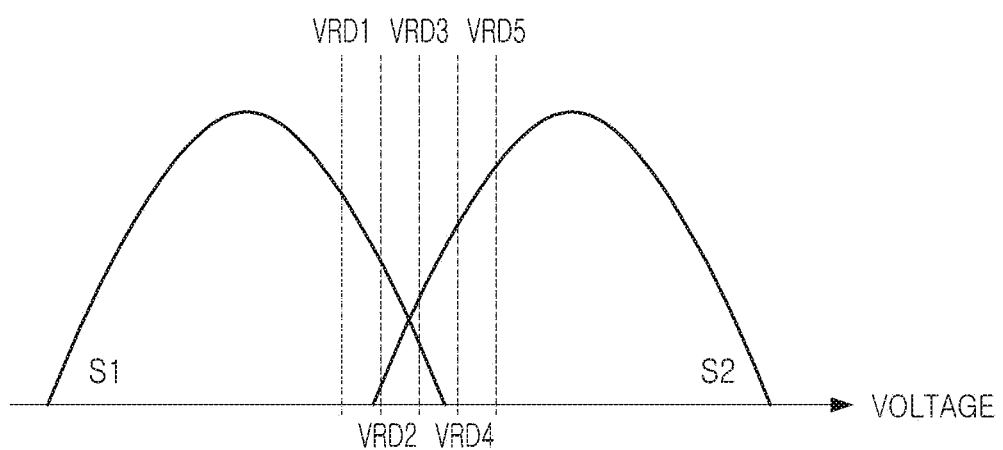
FIGS. 30 and 31 are diagrams illustrating operations of a memory device according to various example embodiments.
Figure 31:
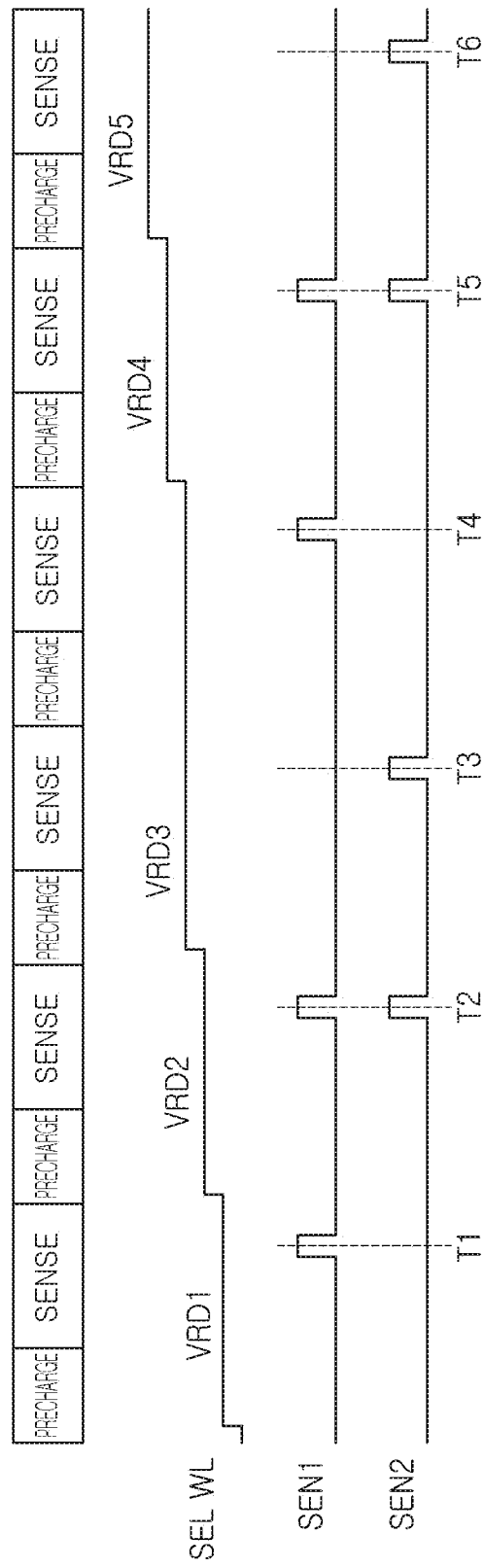

FIGS. 30 and 31 are diagrams illustrating operations of a memory device according to various example embodiments.

In the example embodiment described with reference to FIGS. 30 and 31, pieces of cell count data may be obtained by executing a sensing operation while sequentially applying the first to fifth read voltages VRD1-VRD5 to a selected wordline SEL WL. Pieces of cell count data may correspond to the number of memory cells having a threshold voltage between the first to fifth read voltages VRD1-VRD5 in a state in which the distribution of threshold voltage of the first state S1 and the distribution of threshold voltage of the second state S2 overlap as illustrated in FIG. 30.

First, while a first read voltage VRD1 is applied to a selected wordline SEL WL, the first page buffers may execute a sensing operation at a first time point T1 in response to a first sensing signal SEN1. The first page buffers may determine memory cells having a threshold voltage higher than the first read voltage VRD1 among the first selected memory cells connected through the first bitlines. Thereafter, while the second read voltage VRD2 is applied to the selected wordline SEL WL, the first page buffers and the second page buffers may execute a sensing operation at the second time point T2 by the first sensing signal SEN1 and the second sensing signal SEN2.

At the second time point T2, the first page buffers may determine memory cells having a threshold voltage lower than the second read voltage VRD2, and the second page buffers may determine memory cells having a threshold voltage higher than the second read voltage VRD2. First cell count data, which is the number of memory cells having a threshold voltage between first read voltage VRD1 and second read voltage VRD2, may be generated depending on the results determined by the first page buffers at each of the first time point T1 and the second time point T2.

Thereafter, the third read voltage VRD3 may be input to the selected wordline SEL WL, and at the third time point T3, the second page buffers may execute a sensing operation by the second sensing signal SEN2, and at the fourth time point T4, the first page buffers may execute a sensing operation by the first sensing signal SEN1. At the third time point T3, the second page buffers may determine memory cells having a threshold voltage lower than the third read voltage VRD3, and at the fourth time point T4, the first page buffers may determine memory cells having a threshold voltage higher than the third read voltage VRD3. by the sensing operation executed by the second page buffers at the second time point T2 and third time point T3, second cell count data, which is the number of memory cells having a threshold voltage between the second read voltage VRD2 and the third read voltage VRD3, may be generated.

When the fourth read voltage VRD4 is input to the selected wordline SEL WL, the first page buffers and the second page buffers may execute a sensing operation at the fifth time point T5 by the first sensing signal SEN1 and the second sensing signal SEN2. At the fifth time point T5, the first page buffers PB1 may determine memory cells having a threshold voltage lower than the fourth read voltage VRD4, and the second page buffers PB2 may determine the threshold voltage higher than the fourth read voltage VRD4. By the sensing operation executed by the first page buffers PB1 at fourth time point T4 and the fifth time point T5, third cell count data, which is the number of memory cells having a threshold voltage between the third read voltage VRD3 and the fourth read voltage VRD4, may be generated.

Finally, when the fifth read voltage VRD5 is input to the selected wordline SEL WL, the second page buffers PB2 may execute a sensing operation at the sixth time point T6 by the second sensing signal SEN2. At the sixth time point T6, the second page buffers PB2 may determine memory cells having a threshold voltage lower than the fifth read voltage VRD5. By the sensing operation executed by the second page buffers PB2 at the fifth time point T5 and the sixth time point T6, fourth cell count data, which is the number of memory cells having a threshold voltage between the fourth read voltage VRD4 and the fifth read voltage VRD5, may be generated.

Figure 32:
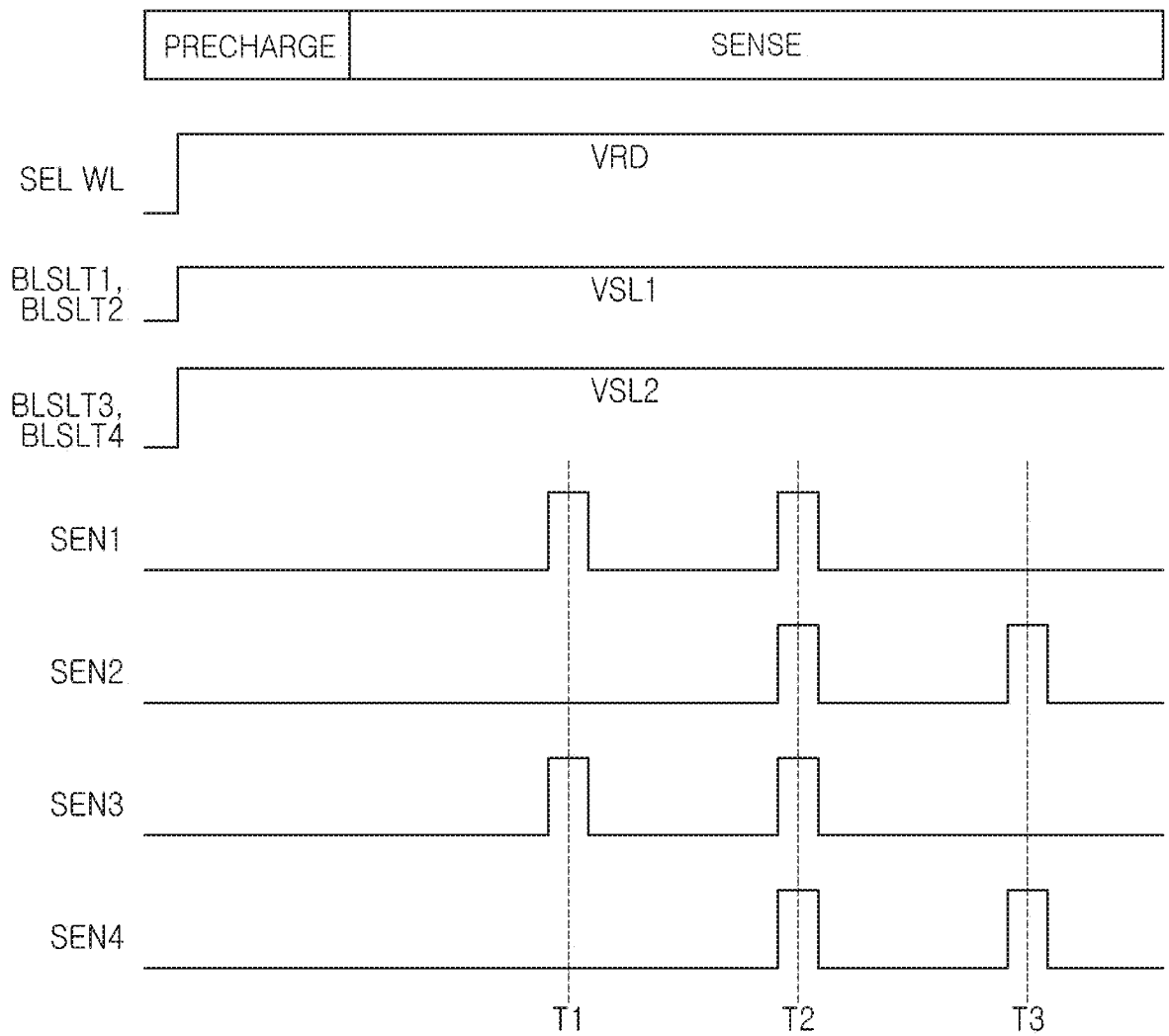
FIGS. 32 and 33 are diagrams illustrating operations of a memory device according to various example embodiments.
Figure 33:
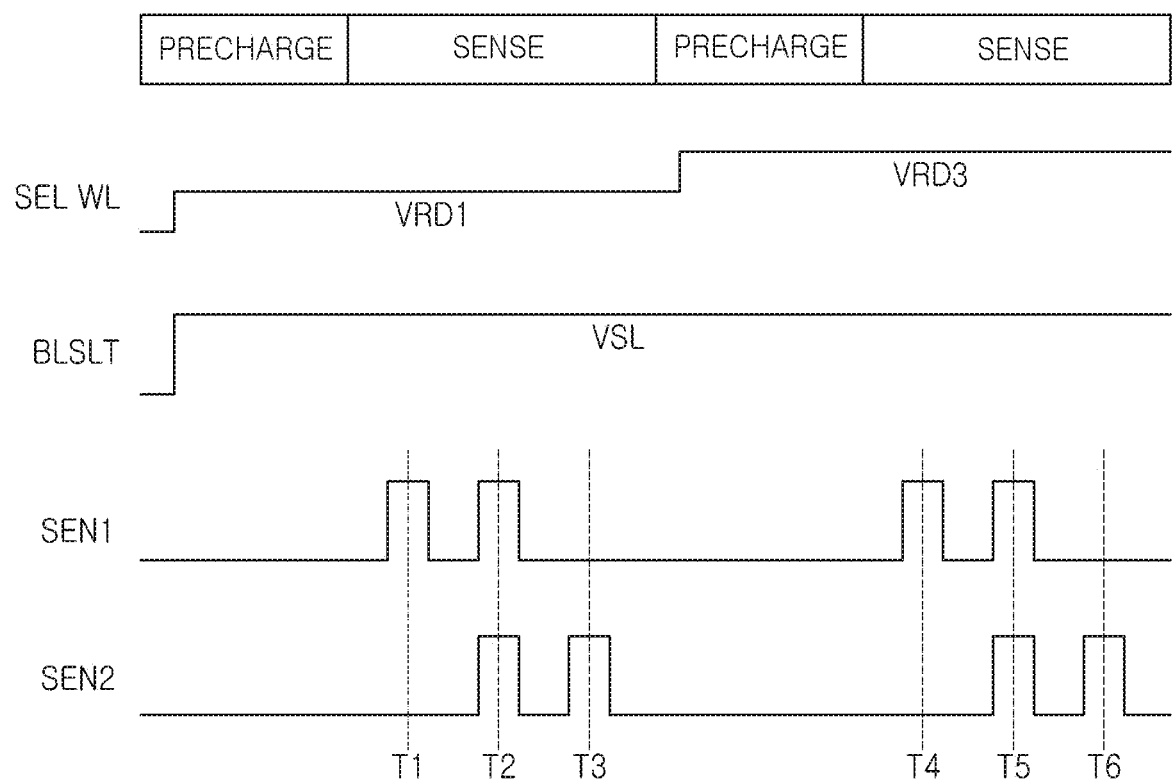

FIGS. 32 and 33 are diagrams illustrating operations of a memory device according to various example embodiments.

First, in various example embodiments described with reference to FIG. 32, a memory device may divide a plurality of bitlines into four groups in a valley search operation. By the operation described with reference to FIG. 32, the memory device may obtain first to fourth pieces of cell count data, which is the number of selected memory cells having a threshold voltage between the first to fifth read voltages VRD1-VRD5. Hereinafter, the valley search operation of the memory device will be described with reference to FIG. 5B.

Differently from the example embodiments described above, in various example embodiments illustrated in FIG. 32, only one read voltage VRD may be input to the selected wordline SEL WL. Accordingly, the time required for the valley search operation may be reduced. Also, a first bitline select signal BLSLT1 input to first page buffers connected to first bitlines and a second bitline select signal BLSLT2 input to second page buffers connected to second bitlines may be set to a first select level VSL1. The third bitline select signal BLSLT3 of the second select level VSL2 may be input to the third page buffers connected to the third bitlines, and the fourth bitline select signal BLSLT4 of the second select level VSL2 may be input to the fourth page buffers connected to the fourth bitlines.

Accordingly, while a constant level of read voltage VRD is input to the selected wordline SEL WL, the magnitude of a current flowing through at least a portion of the first to fourth bitlines may be different from each other. For example, a relatively small current may flow to first and second bitlines, and the largest current may flow to the third and fourth bitlines.

Meanwhile, the first page buffers connected to first bitlines and the second page buffers connected to second bitlines may execute a sensing operation at different time points. Also, the first page buffers may execute a sensing operation at the time points as the third page buffers connected to third bitlines, and the second page buffers may execute a sensing operation at the same time points as the fourth page buffers connected to the fourth bitlines.

For example, at the first time point T1, the first and third page buffers may execute a sensing operation in response to the first and third sensing signals SEN1 and SEN3. Since the bias state is determined such that a relatively small current may flow in the first bitlines and the largest current may flow in the third bitlines, the voltage sensed by the first page buffers may be higher than the voltage sensed by the third page buffers. Accordingly, the first page buffers may determine memory cells having a threshold voltage greater than first read voltage VRD1 having the smallest level. The third page buffers may determine memory cells having a threshold voltage higher than the third read voltage VRD3.

Thereafter, at the second time point T2, the first to fourth page buffers may execute a sensing operation in response to the first to fourth sensing signals SEN1-SEN4. For example, voltages sensed by the first page buffers and the second page buffers at the second time point T2 may be similar or the same. By the sensing operation of the second time point T2, the first page buffers may determine memory cells having a threshold voltage lower than the second read voltage VRD2, and the second page buffers may determine memory cells having a threshold voltage higher than the second read voltage VRD2.

Meanwhile, the voltages sensed by the third page buffers and the fourth page buffers at the second time point T2 may also be similar or the same. By the sensing operation of the second time point T2, the third page buffers may determine memory cells having a threshold voltage lower than the fourth read voltage VRD4, and the fourth page buffers may determine memory cells having a threshold voltage higher than the fourth read voltage VRD4.

At the third time point T3, the second and fourth page buffers may execute a sensing operation in response to the second and fourth sensing signals SEN2 and SEN4. At the third time point T3, the second page buffers may determine memory cells having a threshold voltage higher than the third read voltage VRD3. The fourth page buffers may determine memory cells having a threshold voltage lower than the fifth read voltage VRD5. Accordingly, while the read voltage VRD is applied to the selected wordline SEL WL, the page buffers may obtain first to fourth pieces of cell count data. For example, the first page buffers may obtain first cell count data, the second page buffers may obtain second cell count data, the third page buffers may obtain third cell count data, and the fourth page buffers may obtain fourth cell count data.

Thereafter, a valley search operation of a memory device according to various example embodiments illustrated in FIG. 33 will be described with reference to FIG. 5B.

In various example embodiments described with reference to FIG. 33, a memory device may divide a plurality of bitlines into two groups in a valley search operation. However, a bitline select signal having one select level VSL may be commonly input to a plurality of page buffers connected to the plurality of bitlines. Accordingly, each of the plurality of bitlines may be set to the same bias state.

Referring to FIG. 33, a first read voltage VRD1 and a third read voltage VRD3 may be input to the selected wordline SEL WL in sequence. Each level of the first read voltage VRD1 and the third read voltage VRD3 may be as illustrated in FIG. 5B. While the first read voltage VRD1 is input to the selected wordline SEL WL, the first page buffers connected to the first bitlines may execute a sensing operation at the first time point T1 and the second time point T2 in response to the first sensing signal SEN1. The second page buffers connected to the second bitlines may execute a sensing operation at the second time point T2 and the third time point T3 in response to the second sensing signals SEN2.

In various example embodiments, the first page buffers may determine memory cells having a threshold voltage higher than the first read voltage VRD1 at the first time point T1, and memory cells having a threshold voltage lower than the second read voltage VRD2 at the second time point T2 may be determined. The second page buffers may determine memory cells having a threshold voltage higher than the second read voltage VRD2 at the second time point T2, and memory cells having a threshold voltage lower than the third read voltage VRD3 at the third time point T3 may be determined.

Thereafter, while a third read voltage VRD3 having a level than higher a level of the first read voltage VRD1 is input to the selected wordline SEL WL, the first page buffers connected to the first bitlines may execute a sensing operation at the fourth time point T4 and the fifth time point T5 in response to the first sensing signal SEN1. The second page buffers connected to the second bitlines may execute a sensing operation at the fifth time point T5 and the sixth time point T6 in response to the second sensing signal SEN2.

In various example embodiments, the first page buffers may determine memory cells having a threshold voltage greater than the third read voltage VRD3 at the fourth time point T4, and may determine memory cells having a threshold voltage smaller than the fourth read voltage VRD4 at the fifth time point T5. Also, in various example embodiments, the second page buffers may determine memory cells having a threshold voltage greater than the fourth read voltage VRD4 at the fifth time point T5 and may determine memory cells having a threshold voltage smaller than the fifth read voltage VRD5 at the sixth time point T6.

The magnitude of a current flowing through the bitlines while the third read voltage VRD3 is input to the selected wordline SEL WL may be higher than the magnitude of a current flowing in the bitlines while the first read voltage VRD1 is input to the selected wordline SEL WL. As illustrated in FIG. 33, the memory device may obtain first to fourth pieces of cell count data as described with reference to FIG. 5B by separating the time point at which the page buffers execute the sensing operation and executing the valley search operation.

Pieces of cell count data generated by various example embodiments described above may be used to determine an optimal or good read voltage in a memory device or a memory controller. Hereinafter, an operation of a memory system including a memory device and a memory controller will be described in greater detail with reference to FIGS. 34 and 35.

Figure 34:
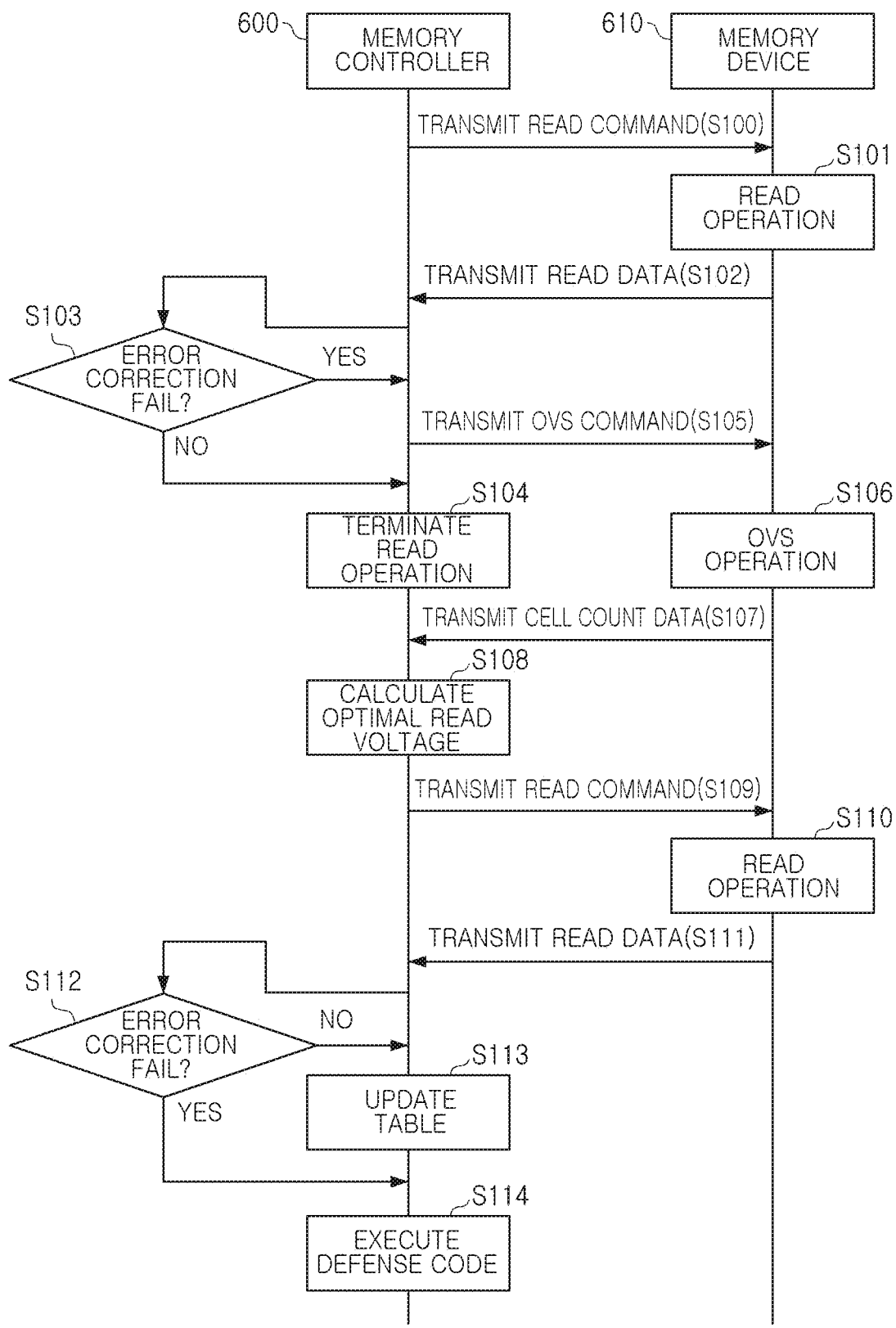
FIGS. 34 and 35 are diagrams illustrating operations of a memory device according to various example embodiments.
Figure 35:
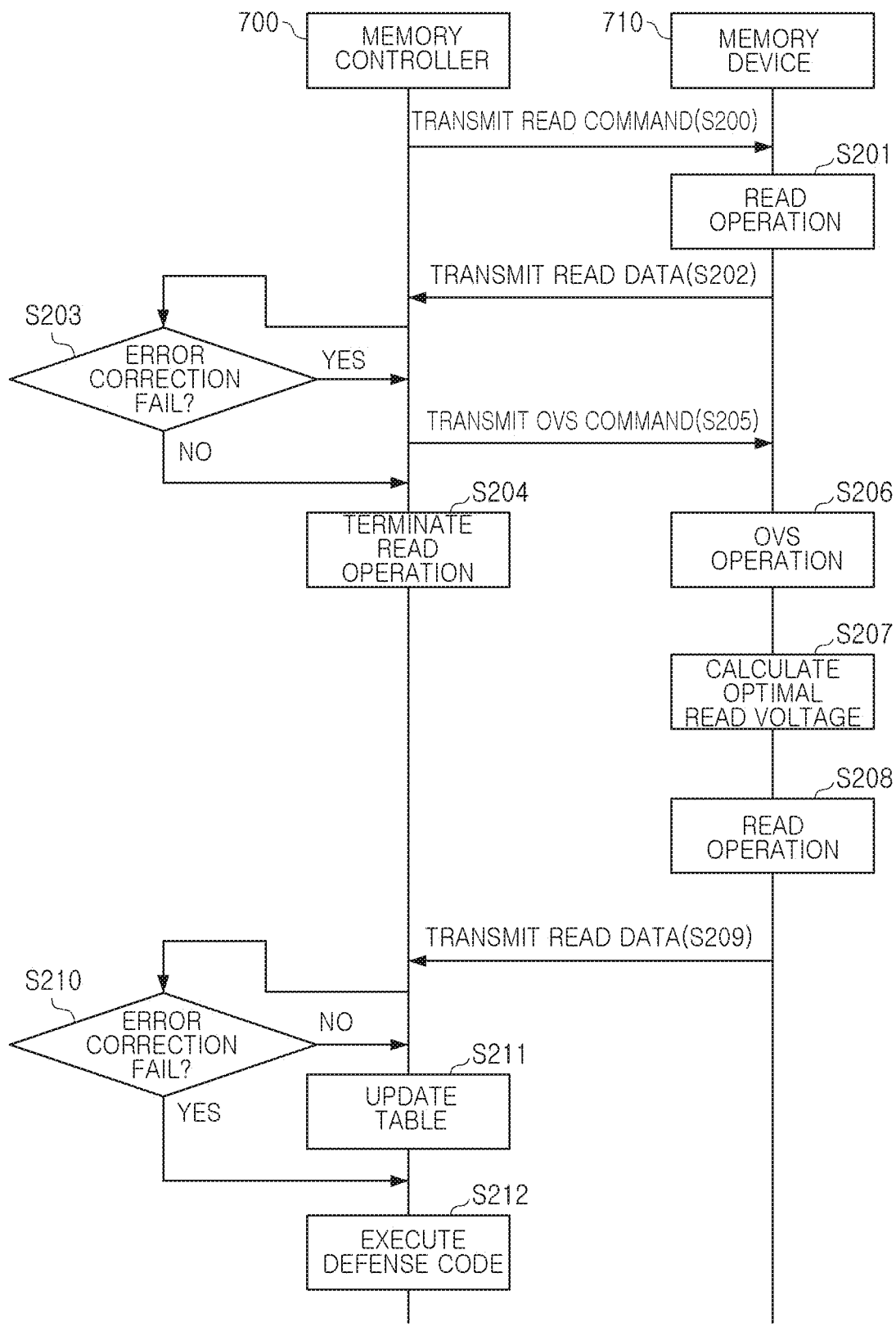

FIGS. 34 and 35 are diagrams illustrating operations of a memory device according to various example embodiments.

Referring first to FIG. 34, the operation of the memory system according to various example embodiments may start when the memory controller 600 transmits a read command to the memory device 610 (S100). The memory device 610 may execute a read operation by referring to address information received together with the read command (S101), and may transmit read data generated as a result of the read operation to the memory controller 600 (S102). The memory controller 600 may input read data to an error correction circuit and may determine whether error correction fails (S103).

In a case in which error correction is successful as a result of the determination of operation S103, the memory controller 600 may terminate the read operation without an additional operation (S104). When it is determined that error correction has failed in operation S103, the memory controller 600 may transmit an OVS command to the memory device 610 (S105). The memory device 610 may execute a valley search operation in response to the OVS command (S106) and may transmit cell count data to the memory controller 600 as a result (S107).

The valley search operation executed in operation S106 may be executed according to one of the example embodiments described above. For example, the memory device 610 may generate pieces of cell count data by dividing a plurality of bitlines into two or more groups and executing a sensing operation multiple times while inputting read voltages to a selected wordline in sequence. The number of pieces of cell count data generated by the memory device 610 may be determined depending on the number of groups of the plurality of bitlines and the number of read voltages input to selected wordlines.

The memory controller 600 may correct a level of the read voltage using the cell count data and may calculate an optimal or good read voltage (S108). The memory controller 600 may transmit a read command including the optimal or good read voltage to the memory device 610 again (S109), and the memory device 610 may input the optimal or good read voltage into the selected wordline and may execute the read operation in response to the read command received in operation S109 (S110). The read data generated as a result of the read operation may be transmitted to the memory controller 600 (S111), and the memory controller may input the read data received in the S111 operation to the error correction circuit and may determine whether error correction fails.

When error correction is successful in operation S112, the memory controller 600 may update a table stored in an internal buffer memory (S113). For example, the table updated in operation S113 may be a history table in which a read voltage input to a selected wordline is written in a read operation in which an error of read data is successfully corrected. When error correction fails in operation S112, the memory controller 600 may execute a defense code (S114).

Thereafter, referring to FIG. 35, the operation of the memory system according to various example embodiments may start with transmitting a read command to the memory device 710 by the memory controller 700 (S200). The memory device 710 may execute a read operation (S201) and may transmit read data generated as a result of the read operation to the memory controller 700 (S202). The memory controller 700 may input read data to an error correction circuit and may determine whether error correction fails (S203).

When error correction is successful as a result of the determination of operation S203, the memory controller 700 may terminate the read operation without an additional operation (S204). When it is determined that error correction has failed in operation S203, the memory controller 700 may transmit an OVS command to the memory device 710 (S205). The memory device 710 may execute a valley search operation in response to the OVS command (S206), may obtain cell count data as a result, and may calculate an optimal or good read voltage (S207). In the example embodiment described with reference to FIG. 33, the memory device 710, rather than the memory controller 700, may calculate an optimal or good read voltage using cell count data.

The memory device 710 may execute the read operation again by inputting the optimal or good read voltage determined in operation S207 to the selected wordline (S208), and may obtain read data and may transmits the data to the memory controller 700 (S209). The memory controller may input the read data received in operation S209 to an error correction circuit and may determine whether error correction fails (S210).

When error correction is successful as a result of the determination of operation S210, the memory controller 700 may update a table stored in an internal buffer memory (S211). The table updated in operation S211 may be or may include or be included in a history table in which a read voltage input to a selected wordline in a read operation in which an error of read data is successfully corrected is written. Meanwhile, when the error correction fails in operation S210, the memory controller 700 may execute a defense code (S212).

According to the aforementioned example embodiments, when error correction for read data output by executing a read operation by the memory device fails, the memory device may execute a valley search operation to correct a read voltage. The memory device may set at least a portion of the bitlines to different bias states while executing the valley search operation, and more pieces of cell count data may be obtained efficiently. Accordingly, the memory device and/or the memory controller may more accurately determine a read voltage optimized for selected memory cells, and reliability and/or performance of the memory device and the memory system including the same may be improved.

Any of the elements and/or functional blocks disclosed above may include or be implemented in processing circuitry such as hardware including logic circuits; a hardware/ software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been illustrated and described above, it will be configured as apparent to those skilled in the art that modifications and variations could be made without departing from the scope of the present disclosure as defined by the appended claims. Additionally example embodiments are not necessarily mutually exclusive with one another. For example, some example embodiments may include one or more features described with reference to one or more figures, and may also include one or more features described with reference to one or more other figures.

What is claimed is:

1. A memory device, comprising:
   a memory cell array including a plurality of memory cells;
   a page buffer circuit connected to the plurality of memory cells through a plurality of bitlines and including a plurality of page buffers configured to sense a state of selected memory cells among the plurality of memory cells; and
   a row decoder connected to the plurality of memory cells through a plurality of wordlines and configured to apply first to third read voltages sequentially in a valley search operation to selected wordlines connected to the selected memory cells, wherein
   the page buffer circuit is configured to set first bitlines and second bitlines to be in a first bias state and to set third bitlines and fourth bitlines to be in a second bias state different from the first bias state in the valley search operation, and
   the page buffer circuit is configured to execute a sensing operation through the first bitlines and the third bitlines while the first read voltage is applied to the selected wordlines, to execute a sensing operation through the first to the fourth bitlines while the second read voltage is applied to the selected wordlines, and to execute a sensing operation through the second bitlines and the fourth bitlines while the third read voltage is applied to the selected wordlines.

2. The memory device of claim 1, wherein each of the plurality of page buffers includes a sensing latch connected to a sensing node, a select circuit connected between one of the plurality of bitlines and the sensing node, and a precharge circuit configured to determine a voltage of the sensing node.

3. The memory device of claim 2, wherein,
   in each of first page buffers connected to the first bitlines and second page buffers connected to the second bitlines, the precharge circuit is configured to precharge the voltage of the sensing node with a first bias voltage, and the select circuit is configured to have a signal of a first select level be input, and
   in each of third page buffers connected to the third bitlines and fourth page buffers connected to the fourth bitlines, the precharge circuit is configured to precharge the voltage of the sensing node with the first bias voltage, and a signal of a second select level different from the first select level is input to the select circuit.

4. The memory device of claim 3, wherein
   the select circuit includes a select transistor connected between one of the plurality of bitlines and the sensing node, and
   the first select level is less than the second select level.

5. The memory device of claim 2, wherein,
   in each of first page buffers connected to the first bitlines and second page buffers connected to the second bitlines, the precharge circuit is configured to precharge a voltage of the sensing node with a first bias voltage, and the select circuit is configured to have a signal of a first select level input, and
   in each of third page buffers connected to the third bitlines and fourth page buffers connected to the fourth bitlines, the precharge circuit is configured to precharge a voltage of the sensing node with a second bias voltage different from the first bias voltage, and the select circuit is configured to have the signal of the first select level input.

6. The memory device of claim 5, wherein a level of the first bias voltage is higher than a level of the second bias voltage.

7. The memory device of claim 1, wherein, the page buffer circuit is configured to simultaneously execute a sensing operation through the first to fourth bitlines while the second read voltage is applied to the selected wordlines.

8. The memory device of claim 1, wherein, while the first read voltage is applied to the selected wordlines, the page buffer circuit is configured to execute a sensing operation through the first bitlines and to subsequently execute a sensing operation through the third bitlines.

9. The memory device of claim 8, wherein, while the second read voltage is applied to the selected wordline, the page buffer circuit is configured to first execute a sensing operation through the first bitlines and the second bitlines and to subsequently execute a sensing operation through the third bitlines and the fourth bitlines.

10. The memory device of claim 9, wherein, while the third read voltage is applied to the selected wordline, the page buffer circuit is configured to first execute a sensing operation through the second bitlines and to subsequently execute a sensing operation through the fourth bitlines.

11. The memory device of claim 1, further comprising:
    a control logic configured to control the row decoder and the page buffer circuit and to determine a read voltage using cell count data obtained in the valley search operation,
    wherein the page buffer circuit is configured to execute a read operation on the selected memory cells while the row decoder inputs the read voltage to the selected wordlines.

12. The memory device of claim 1, further comprising:
    a control logic configured to control the row decoder and the page buffer circuit, wherein
    the control logic is configured to transmit cell count data obtained in the valley search operation to an external memory controller, and to receive a read voltage from the external memory controller, and
    wherein the page buffer circuit is configured to execute a read operation on the selected memory cells while the row decoder inputs the read voltage to the selected wordlines.

13. The memory device of claim 1, wherein the second read voltage is higher than the first read voltage and less than the third read voltage.

14. A memory device, comprising:
a cell region in which a plurality of memory cells are arranged; and
a peripheral circuit region in which a row decoder is connected to the plurality of memory cells through a plurality of wordlines, a plurality of page buffers is connected to the plurality of memory cells through a plurality of bitlines, and a control logic configured to control the row decoder and the plurality of page buffers is arranged, wherein
the row decoder is configured to sequentially input a plurality of read voltages having different levels to a selected wordline among the plurality of wordlines,
each of the plurality of page buffers includes a sensing node connected to a corresponding one of the plurality of bitlines,
voltages of the sensing nodes included in a portion of the page buffers, among the plurality of page buffers, decrease differently while each of the plurality of read voltages is input to the selected wordline, and
a slope of the decrease of the voltages of the sensing nodes is determined based on a turn-on voltage applied to a bit line select transistor included in the plurality of page buffers.

15. The memory device of claim 14, wherein
the plurality of page buffers include first page buffers connected to first bitlines, second page buffers connected to second bitlines, third page buffers connected to third bitlines, and fourth page buffers connected to fourth bitlines, and
while each of the plurality of read voltages is input to the selected wordline, a decreasing slope of a voltage of each of the sensing nodes included in the first page buffers and the second page buffers is different from a decreasing slope of a voltage of each of the sensing nodes included in the third page buffers and the fourth page buffers.

16. The memory device of claim 15, wherein
while each of the plurality of read voltages is input to the selected wordline, each of the sensing nodes included in the first page buffers, the second page buffers, the third page buffers, and the fourth page buffers is precharged with a first precharge voltage, and
a voltage of each of the sensing nodes included in the first page buffers and the second page buffers has a first decreasing slope, and a voltage of each of the sensing nodes included in the third page buffers and the fourth page buffers has a second decreasing slope of greater absolute value than the first decreasing slope.

17. The memory device of claim 15, wherein,
while each of the plurality of read voltages is input to the selected wordline, each of the sensing nodes included in the first page buffers and the second page buffers is precharged with a first precharge voltage, and each of the sensing nodes included in the third page buffers and the fourth page buffers is precharged with a second precharge voltage lower than the first precharge voltage, and
the sensing nodes included in the first page buffers, the second page buffers, the third page buffers, and the fourth page buffers have the same decreasing slope.

18. The memory device of claim 14, wherein the plurality of page buffers is configured to, by executing a sensing operation a plurality of times while the plurality of read voltages are input to the selected wordline, obtain cell count data including a number of a portion of selected memory cells having a threshold voltage between the plurality of read voltages, among selected memory cells connected to the selected wordline.

19. The memory device of claim 18, wherein the control logic is configured to divide the plurality of bitlines into an N number of groups, to divide the plurality of page buffers into the N number of groups, and the number of the cell count data is N, where N is a natural number of 4 or more.

20. A memory device, comprising:
a cell region in which a plurality of memory cells are arranged; and
a peripheral circuit region in which a row decoder is connected to the plurality of memory cells through a plurality of wordlines, a plurality of page buffers connected to the plurality of memory cells through a plurality of bitlines, and a control logic configured to control the row decoder and the plurality of page buffers are arranged, wherein
the control logic is configured to control the row decoder such that a plurality of read voltages having different levels are sequentially input to a selected wordline among the plurality of wordlines during a valley search operation,
the plurality of page buffers include a first page buffer connected to a first bitline and second page buffer connected to a second bitline different from the first bitline, and
while a first read voltage among the plurality of read voltages is input to the selected wordline, a current input to the first bitline by the first page buffer is different from a current input to the second bitline by the second page buffer.

* * * * *